US012770867B2

(12) United States Patent
Ruther et al.

(10) Patent No.: US 12,770,867 B2
(45) Date of Patent: Oct. 20, 2026

(54) SILICON ANODE FOR USE IN AN ELECTROCHEMICAL CELL

(71) Applicant: Solid Power Operating, Inc., Louisville, CO (US)

(72) Inventors: Rose E. Ruther, Lafayette, CO (US); Kristen T. Hietala, Boulder, CO (US); Steven Madachy, Broomfield, CO (US)

(73) Assignee: Solid Power Operating, Inc., Louisville, CO (US)

( * ) Notice: Subject to any disclaimer, the term of this patent is extended or adjusted under 35 U.S.C. 154(b) by 532 days.

(21) Appl. No.: 18/222,346

(22) Filed: Jul. 14, 2023

(65) Prior Publication Data

US 2024/0030420 A1 Jan. 25, 2024

Related U.S. Application Data

(60) Provisional application No. 63/436,475, filed on Dec. 30, 2022, provisional application No. 63/389,650, filed on Jul. 15, 2022.

(51) Int. Cl.

*H01M 4/38* (2006.01)
*H01M 4/1395* (2010.01)
*H01M 4/62* (2006.01)
*H01M 4/66* (2006.01)

(Continued)

(52) U.S. Cl.

CPC ......... *H01M 4/386* (2013.01); *H01M 4/1395* (2013.01); *H01M 4/622* (2013.01); *H01M 4/669* (2013.01); *H01M 10/0562* (2013.01); *H01M 2004/027* (2013.01); *H01M 2300/0068* (2013.01)

(58) Field of Classification Search

CPC .... H01M 4/386; H01M 4/1395; H01M 4/622; H01M 4/669; H01M 10/0562; H01M 2004/027; H01M 2300/0068

USPC ........................................................ 429/218.1

See application file for complete search history.

(56) References Cited

U.S. PATENT DOCUMENTS 7,192,673 B1 3/2007 Ikeda et al.
7,794,878 B2 9/2010 Kogetsu et al.
7,794,881 B1 9/2010 Fujimoto et al.

(Continued)

FOREIGN PATENT DOCUMENTS

CN 113764625 A 12/2021
DE 102019211857 B3 11/2020

(Continued)

OTHER PUBLICATIONS

Filchakova, M., What are Multi Walled Carbon Nanotubes? MWCNT Production, Properties, and Applciations, OCSiAI, Dec. 1, 28, 2021 (9 pages). http://tuball.com/articles/multi-walled-carbon-nanotubes.

(Continued)

*Primary Examiner* — James M Erwin

(74) *Attorney, Agent, or Firm* — Polsinelli PC; Blake Andrew Ronnebaum

(57) ABSTRACT

Provided herein is a negative electrode or anode for an electrochemical cell, the anode comprising nanoscale silicon. The nanoscale silicon facilitates the formation of vertical cracks in the anode layer when the anode is cycled in an electrochemical cell, which improves cell performance as compared to a silicon anode that forms random or horizontal cracks when the anode is cycled.

22 Claims, 18 Drawing Sheets

(51) Int. Cl.

| | |
|---|---|
| ***H01M 10/0562*** | (2010.01) |
| *H01M 4/02* | (2006.01) |

(56) References Cited

U.S. PATENT DOCUMENTS

| | | | | |
|---|---|---|---|---|
| 8,399,129 | B2 | 3/2013 | Ugaji et al. | |
| 9,263,771 | B2 | 2/2016 | Fukui et al. | |
| 10,008,716 | B2 | 6/2018 | Abdelsalam et al. | |
| 10,109,856 | B2 | 10/2018 | Sawa | |
| 2007/0226990 | A1 | 10/2007 | Morimoto | |
| 2007/0281216 | A1 | 12/2007 | Petrat et al. | |
| 2010/0099029 | A1 | 4/2010 | Kinoshita et al. | |
| 2010/0288970 | A1 | 11/2010 | Watanabe et al. | |
| 2012/0244441 | A1 | 9/2012 | Noda et al. | |
| 2017/0077498 | A1 | 3/2017 | Fukasawa et al. | |
| 2019/0148718 | A1 | 5/2019 | Hatazawa et al. | |
| 2020/0212450 | A1* | 7/2020 | Shimizu | H01M 4/74 |
| 2020/0243847 | A1 | 7/2020 | Mitsumoto | |
| 2021/0194039 | A1* | 6/2021 | Burdynska | H01M 8/1046 |
| 2021/0265618 | A1* | 8/2021 | Gokhale | H01M 4/133 |
| 2021/0284541 | A1* | 9/2021 | Mochizukj | C01B 33/02 |
| 2021/0313562 | A1 | 10/2021 | Goodman | |
| 2021/0384498 | A1 | 12/2021 | Suzuki et al. | |
| 2022/0181610 | A1 | 6/2022 | Yamano | |
| 2022/0216505 | A1* | 7/2022 | Lin | H01M 10/0525 |
| 2023/0017977 | A1 | 1/2023 | Lee et al. | |
| 2023/0127602 | A1 | 4/2023 | Lee et al. | |

FOREIGN PATENT DOCUMENTS

| | | | |
|---|---|---|---|
| JP | 3896025 | B2 | 3/2007 |
| JP | 4197491 | B2 | 12/2008 |
| JP | 5940345 | B2 | 6/2016 |
| JP | 2018142431 | A | 9/2018 |

OTHER PUBLICATIONS

International Searching Authority, International Search Report and Written Opinion, issued in connection with co-pending International Application No. PCT/US2023/027837, mailed Oct. 26, 2023.

Lai et al., "Morphology engineering of silicon nanoparticles for better performance in Li-ion battery anodes" Nanoscale Advances, 2(11): 5335-5342, 2020.

Okuno et al., "Electrochemical Study on Porous Silicon Anode in Sulfide-Based All-Solid-State Lithium-Ion Batteries: II" ECS Meeting Abstracts, MA2020-01 (2841): 2020.

Wiggers et al., "Silicon Particle Formation by Pyrolysis of Silane in a Hot Wall Gasphase Reactor" Chemical Engineering and Technology, 24(3): 261-264, 2001.

International Searching Authority, International Search Report and Written Opinion, issued for International Application No. PCT/US2022/054401, dated Mar. 14, 2023 (11 pages).

International Searching Authority, International Preliminary Report on Patentability, issued for International Application No. PCT/US2023/027837, dated Oct. 1, 2024.

Yamamoto, M. et al., Slurry mixing for fabricating silicon-composite electrodes in all-solid state batteries with high areal capacity and cycling stability, Journal of Power Sources, 400:506-512, 2018 (7 pages).

Tan, D. H. S. et al., Carbon-free high-loading silicon anodes enabled by sulfide solid electrolytes, Science, 373(6562): 1494-1499, 2021 (6 pages).

International Searching Authority, International Search Report and Written Opinion, issued for International Application No. PCT/US2023/027834, dated Oct. 9, 2023.

* cited by examiner

SILICON ANODE FOR USE IN AN ELECTROCHEMICAL CELL

CROSS-REFERENCE TO RELATED APPLICATIONS

This application is related to and claims priority under 35 U.S.C. § 119(e) from U.S. Provisional Application No. 63/389,650 filed Jul. 15, 2022 entitled "Silicon Anode For Use in an Electrochemical Cell," and from U.S. Provisional Application No. 63/436,475 filed Dec. 30, 2022 entitled "Silicon Anode For Use in an Electrochemical Cell," both of which are hereby incorporated by reference in their entirety.

TECHNICAL FIELD

Various embodiments described herein relate to the field of solid-state primary and secondary electrochemical cells, electrodes, and electrode materials, and the corresponding methods of making and using the same.

BACKGROUND

Lithium-based rechargeable batteries are popular to power many forms of modern electronics and have the capability to serve as the power source for hybrid and fully electric vehicles. State-of-the-art lithium-based rechargeable batteries typically employ a carbon-based anode to store lithium ions. In these anodes, lithium ions are stored by intercalating between planes of carbon atoms that compose graphite particles. Carbon-based anodes have been tailored to confer acceptable performance in modern lithium-ion batteries. However, carbon-based anodes are reaching maturity in terms of their lithium-ion storage.

An alternative to the carbon-based anode is an alloy-type anode. In the alloy-type anode, rather than intercalating between sheets of carbon in graphite particles, the lithium ions alloy with the active anode material. These materials may have up to ten times (10×) more lithium-ion storage capacity as compared to that of graphite anodes. The typical alloy-type anodes include silicon, tin, and aluminum, as well as more exotic materials, such as germanium and gold. These alloy materials have their own advantages and disadvantages, such as cost, specific capacity, processability, and voltage penalty.

One of the challenges to confront in these systems is the volume change associated with alloying lithium with the active material. For example, volume changes near 400% can happen with some systems. The volume change can cause difficulties from a macro and micro level. At the macro level, a battery pack may have to accommodate a swelling cell, and at the micro level, the continuous expansion and contraction of the active area can lead to cracking. The particles in the active area then can lose electrical connection with their surrounding matrix and can also undergo undesirable side reactions between the fresh surfaces of the particles and the battery electrolyte.

Silicon (Si) is one example of an alloy-type anode material, which theoretically can store more than ten times the amount of lithium ions as compared to graphite, has a modest voltage penalty, and in its bulk form is abundant and inexpensive. Unfortunately, in conventional liquid electrolyte lithium-ion cells, the large (e.g., 400%) volume change of silicon-lithium alloys has frustrated efforts to employ silicon in the anode. As the material expands and contracts, cracking occurs and the fresh surfaces of the cracks that are exposed react to form a new solid electrolyte interphase, which consumes electrolyte and the supply of lithium in the cell. Therefore, the cell loses a portion of its capacity during each cycle and may ultimately fail after some numbers of cycles.

Although progress has been made in the field of lithium batteries, there remains a need in the art for a solid-state anode that is more resistive to cracking and that has improved coulombic efficiency.

SUMMARY

Provided herein is an anode layer for use in an electrochemical cell. The anode layer comprises an anode active material comprising silicon having an average particle size of less than 1 μm and a binder. The anode active material is present in an amount of greater than or equal to about 40% by weight of the anode layer. Further, the anode layer is characterized by the formation of a plurality of vertical cracks having a thickness of less than or equal to 5 μm after a first cell cycle or a series of conditioning cycles.

In some embodiments, the distance between each of the plurality of vertical cracks is greater than or equal to 2 μm after the first cell cycle or the series of conditioning cycles of the electrochemical cell.

In some embodiments, a stack pressure of about 100 psi to about 2500 psi is applied to the electrochemical cell. In some aspects, a stack pressure of about 300 psi to about 1500 psi is applied during the first cell cycle or the series of conditioning cycles. In an exemplary embodiment, a stack pressure of about 1500 psi is applied during the first cell cycle or series of conditioning cycles.

In some embodiments, the anode active material is present in the anode layer in an amount of about 50% to about 85% by weight of the anode layer. In some additional embodiments, the anode active material is present in the anode layer in an amount of about 50% to about 60% by weight of the anode layer. In some additional embodiments, the anode active material is present in the anode layer in an amount of about 40% to about 60% by weight of the anode layer.

In some embodiments, the anode layer further comprises a conductive additive. In some aspects, the conductive additive is present in an amount of about 0% to about 15% by weight of the anode layer, or more preferably about 0% to about 5% by weight of the anode layer. In some additional aspects, the conductive additive comprises one or more carbon conductive materials.

In some embodiments, the anode layer further comprises a solid-state electrolyte material. In some aspects, the solid-state electrolyte material is present in an amount of about 0% to about 50% by weight of the anode layer, or more preferably about 35% to about 45% by weight of the anode layer. In some additional aspects, the solid-state electrolyte comprises as sulfide solid-state electrolyte material.

In some embodiments, the anode layer further comprises a binder. In some aspects, the binder is present in an amount of about 0% to about 20% by weight of the anode layer, or more preferably about 4% to about 5% by weight of the anode layer. In additional aspects, the binder comprises one or more styrenic block copolymers. In additional aspects, the binder is selected from the group consisting of styrene-butadiene-styrene block copolymer (SBS), styrene-ethylene-butylene-styrene block copolymer (SEBS), ethylene propylene diene monomer rubber (EPDM), polystyrene (PS), styrene-isoprene block copolymer (SIS), and combinations thereof.

In some embodiments, the anode layer is coated on a current collector. In some aspects, the current collector comprises one or more of copper, nickel, and steel. In other aspects, the current collector may comprise any material that conducts electrons (e.g., carbon fiber).

In some embodiments, the anode layer has a thickness of about 1 μm to about 100 μm, or more preferably about 10 μm to about 50 μm.

In some embodiments, the silicon comprises particles having a surface area of about 1 $m^2/g$ to about 50 $m^2/g$. In some aspects, the silicon comprises branched particles. In some additional aspects, the silicon comprises linear particles.

In an exemplary embodiment, the anode layer appears as shown in FIG. 1. In another exemplary embodiment, the anode layer appears as shown in FIG. 5.

Further provided herein is an electrochemical cell comprising the anode layer described above. In some embodiments, the electrochemical cell has a capacity retention of about 80% after 100 cycles or more, or more preferably after 500 cycles or more, or even more preferably after 1000 cycles or more.

The electrochemical cell further comprises a separator layer and a cathode layer. In some embodiments, the cathode layer may have a specific capacity of greater than about 100 mAh/g for at least 100 cycles.

Further provided herein is a method of making an anode layer of the present disclosure. The method comprises: a) mixing a silicon or an alloy thereof, at least one solid electrolyte material, at least one binder material, and a solvent to form a slurry; b) casting the slurry onto a substrate; and c) drying the slurry to form the anode layer. In some aspects, the solvent is added to the silicon or alloy thereof, the at least one solid electrolyte material, and the at least one binder material while mixing. In some aspects, the solvent is added to the silicon or alloy thereof, the at least one solid electrolyte material, and the at least one binder material before mixing. In some aspects, the solvent comprises aprotic hydrocarbons, esters, ethers, nitriles, or combinations thereof.

In some embodiments, the method further comprises calendering the anode layer. In some aspects, the calendering occurs at a temperature from about 80° C. to about 140° C.

Further provided herein is a composition comprising an anode active material comprising silicon having an average particle size of less than 1 μm, a solid-state electrolyte material, a conductive additive, and a binder. The anode active material is present in an amount of greater than or equal to 50% by weight of the anode layer. The composition has a density of about 1 $g/cm^3$ to about 1.75 $g/cm^3$.

In some embodiments, the conductive additive is present in an amount of about 2% to about 15% by weight of the composition, or more preferably about 2% to about 5% by weight of the composition. In some additional embodiments, the conductive additive comprises one or more conductive carbon materials.

In some embodiments, the solid-state electrolyte material is present in an amount of about 0% to about 50% by weight of the composition, or more preferably about 35% to about 45% by weight of the composition. In some additional embodiments, the solid-state electrolyte material comprises a sulfide solid-state electrolyte material.

In some embodiments, the binder is present in an amount of about 0% to about 20% by weight of the composition, or more preferably about 4% to about 5% by weight of the composition. In some embodiments, the binder comprises one or more styrenic block copolymers. In additional aspects, the binder is selected from the group consisting of styrene-butadiene-styrene block copolymer (SBS), styrene-ethylene-butylene-styrene block copolymer (SEBS), ethylene propylene diene monomer rubber (EPDM), polystyrene (PS), styrene-isoprene block copolymer (SIS), and combinations thereof.

In some embodiments, the anode active material is present in an amount of about 85% by weight of the composition. In some additional embodiments, the silicon comprises particles having a surface area of about 1 $m^2/g$ to about 50 $m^2/g$. In some aspects, the silicon comprises branched particles. In some additional aspects, the silicon comprises linear particles.

In some embodiments, the composition is characterized by the formation of a plurality of vertical cracks having a thickness of less than or equal to 5 μm after a first cell cycle or a series of conditioning cycles. The cracking may appear as shown in the anode layer of any one of FIG. 1, FIG. 3, FIG. 6, FIG. 7, FIGS. 11A-11E, FIGS. 12A-12E, FIG. 13A, or FIG. 13C.

Further provided herein is an anode layer for use in an electrochemical cell. The anode layer comprises an anode active material comprising silicon having an average particles size of less than 1 μm, wherein the anode active material is present in an amount of about 85% by weight of the anode layer; a conductive additive, wherein the conductive additive is present in an amount of about 10% by weight of the anode layer; and a binder, wherein the binder is present in an amount of about 5% by weight of the anode layer, and wherein the anode layer is characterized by the formation of a plurality of vertical cracks having a thickness of less than or equal to 5 μm after a first cell cycle or a series of conditioning cycles.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

FIG. 5 shows the cell capacity retention of the of the electrochemical cells (mAh/g).

FIG. 6 shows vertical cracking in the anode layer.

FIG. 7 shows vertical cracking in the anode layer.

FIG. 10 shows the cell capacity retention of the electrochemical cells (mAh/g).

FIGS. 11A-11E show vertical cracking in the anode layer.

FIGS. 12B, 12D, and 12E show vertical cracking in the anode layer.

FIGS. 13A and 13C show vertical cracking in the anode layer.

As shown in FIG. 14C, the surface of the vertical cracks do not include the silicon oxide coating.

DETAILED DESCRIPTION

Figure 1:
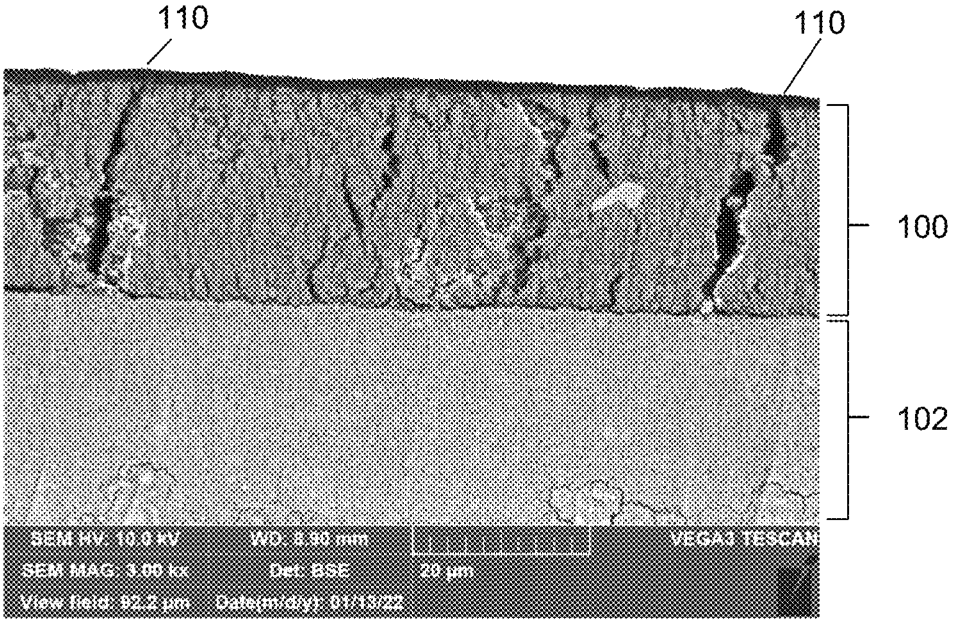
FIG. 1 shows a scanning electron micrograph of an electrochemical cell including an anode layer comprising silicon having an average particle size of about 50 nm to about 80 nm and a stack pressure of 300 psi.
Figure 2:
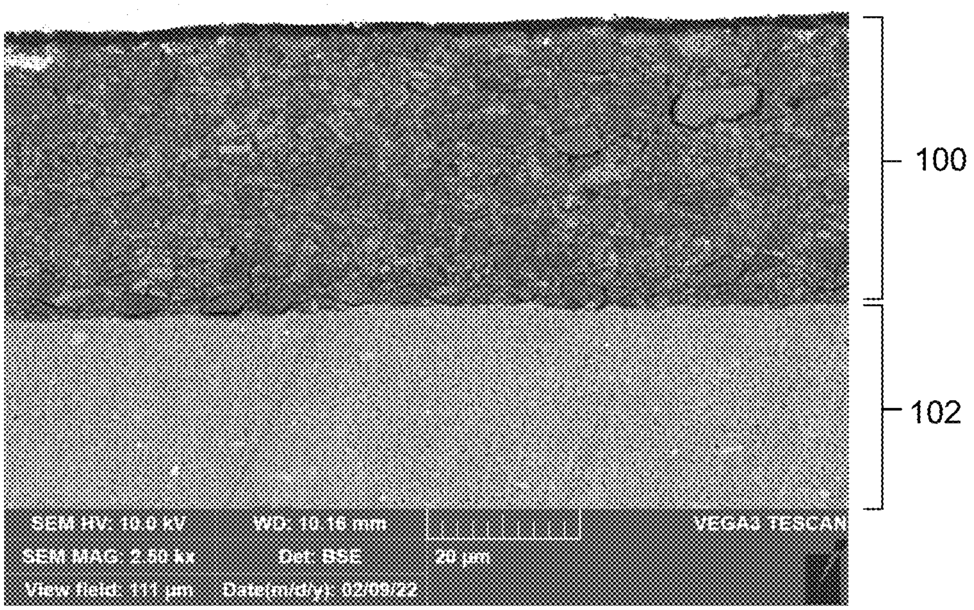
FIG. 2 shows a scanning electron micrograph of an electrochemical cell including an anode layer comprising silicon having an average particle size of about 1-8 microns and a stack pressure of 300 psi.
Figure 3:
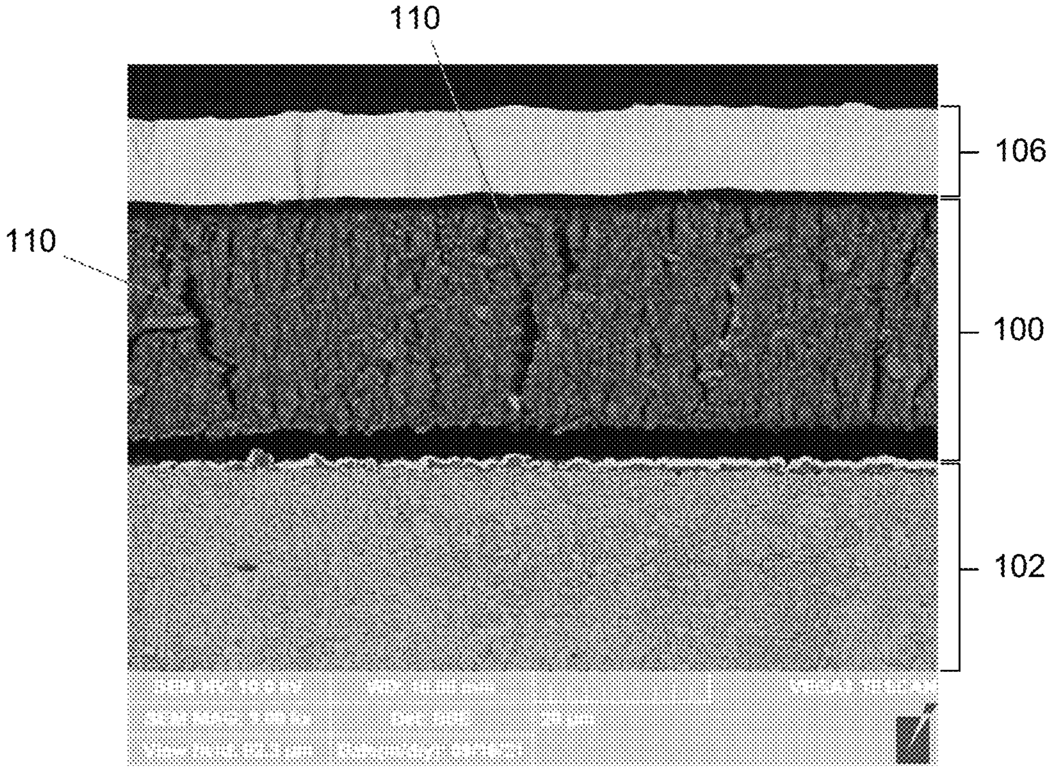
FIG. 3 shows a scanning electron micrograph of an electrochemical cell including an anode layer comprising silicon having an average particle size of about 50-80 nm and a stack pressure of 300 psi.
Figure 4:
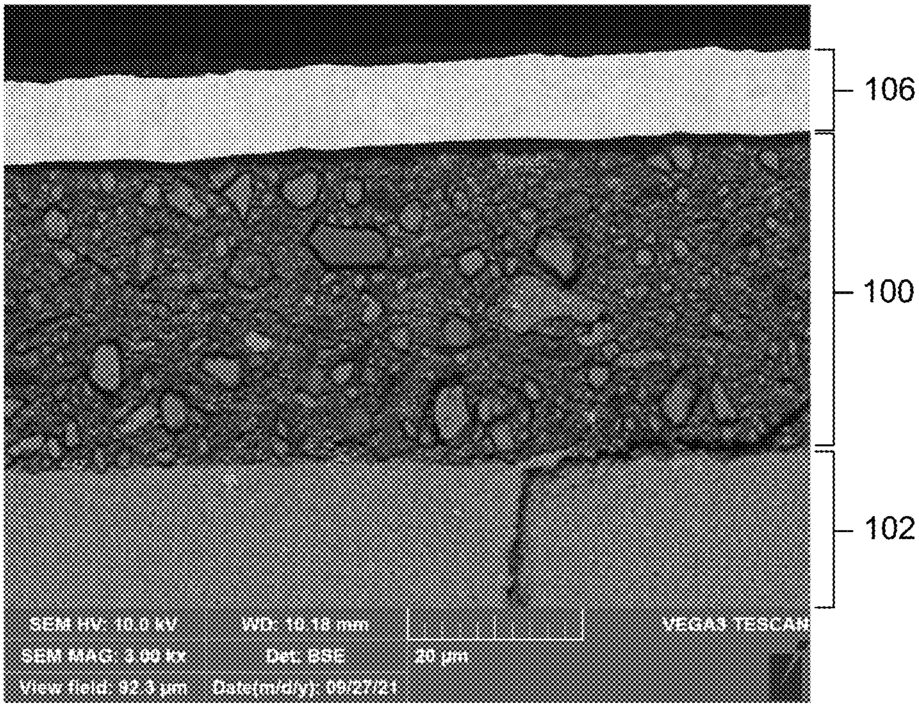
FIG. 4 shows a scanning electron micrograph of an electrochemical cell including an anode layer comprising silicon having an average particle size of about 1-9 microns and a stack pressure of 300 psi.

In the following description, specific details are provided to impart a thorough understanding of the various embodiments of the disclosure. Upon having read and understood the specification, claims, and drawings hereof, those skilled in the art will understand that some embodiments may be practiced without hewing to some of the specific details set forth herein. Moreover, to avoid obscuring the disclosure, some well-known methods, processes, devices, and systems utilized in the various embodiments described herein are not disclosed in detail.

In solid-state anodes, it has been surprisingly discovered that the use of nanoscale silicon tends to form more vertical cracks as compared to microscale silicon, which tends to form cracks that are more branched and angled. As used herein, microscale silicon refers to silicon having a primary particle diameter of greater than 1 micron. Additionally, formation of vertical cracks was observed in compositions including solid electrolyte materials and carbon conductive additives without negative consequences. Previously, it was thought that the inclusion of carbon additives in similar compositions would accelerate decomposition of solid electrolytes in the composition.

Nanoscale architectures of silicon are typically high surface area materials. It is understood that the larger the surface area, the more undesirable side reactions will occur during the operation of the lithium rechargeable battery. Additionally, this surface area may contain oxygen or other impurities that reduce the specific capacity of the silicon material, which impacts the cycle life. However, the inventors surprisingly found that compositions described herein have improved properties including cycle life and specific capacity.

As demonstrated herein, nanostructured silicon composed of branched particles with low surface area demonstrates very high first cycle efficiency when integrated into a solid-state electrolyte. As used herein, "branched particles" refers to particles that include three or more primary particles in a series. As used herein, a "primary particle" refers to an individual grain in a powder material. Each primary particle may comprise one or more crystallites. Crystallites, as used herein, refer to individual crystals which form the primary particles. Two or more primary particles may agglomerate to form secondary particles. Due to the low surface area, there is only a small amount of silicon that requires passivation through side reactions. Additionally, the branched structure creates a porous architecture, which makes it difficult for the solid-state electrolyte material to directly contact the silicon. Since the solid-state electrolyte is not mobile, silicon surfaces that are not in contact with the electrolyte initially will never undergo a reaction with the electrolyte.

The porous, branched, rough network of the nanostructured silicon is also able to anchor itself into the surrounding composite matrix to create a mechanically robust structure. With a strong interface formed, lithium transport to the silicon particles is facile and particles remain anchored in the network. Without wishing to be bound by theory, silicon powders with higher surface area tend to have poorer anode cohesion and may require more binder to maintain structural integrity. With a strong interface formed, lithium transport to the silicon particles is facile and particles remain anchored in the network. Furthermore, the voids in the branched network allow room for the silicon to expand, which explains the high capacity of this particular silicon morphology. With this silicon structure in a solid-state electrolyte, there are a limited amount of side reactions that can occur, voids exist to accommodate silicon expansion, and the particles remain solidly anchored in the composite matrix. The net effect is a very high first cycle efficiency giving rise to high capacity and long cycle life.

The inventors have also found that the particle size of the silicon correlates strongly with the formation of vertical cracks after cycling. As used herein, the particle size of the silicon refers to the size of the primary silicon particles as opposed to the size of sintered or bridged clusters of silicon. Large particles tend to disrupt the formation of vertical cracks and promote more random and radial cracking. The nanoscale silicon also has a low surface area due to its branched morphology. The low surface area and small particle size lead to the formation of an agglomerated or chain-like morphology that structurally supports the silicon anode.

The nanoscale silicon further has a low crystallite size. As previously mentioned, crystallites are individual crystals that form the primary particles of silicon. The small crystallite size and low surface area silicon results in an electrochemical cell with increased cell performance compared to cells that use silicon with small crystallite size and high surface area and silicon with large crystallite size and low surface area. The small crystallite size of the silicon used herein alleviates cracking of individual particles and potential loss of active material. The specific morphology of small crystallite size and low surface area prevents the silicon from forming a detrimental $Li_{15}Si_4$ phase, which tends to form when the silicon is fully lithiated. Additionally, using the small crystallite size and low surface area Si material allows for the increase in processability by allowing for mixing the composite into a slurry with rheological properties ideal for casting/coating. These properties include high solids loading which allows for using less solvent, cutting back on the dry time of the casted layers and slurry stability, thereby giving a larger window of time to perform casting and/or coating.

A high first cycle efficiency is beneficial to enabling a long-life lithium-ion cell. In a cell with a lithium containing cathode and an anode initially devoid of lithium, the cyclable lithium available to the cell is contained in the cathode. During the first charge of the cell, lithium is removed from the cathode and reacts with the active component of the anode. Some of the lithium may be lost to undesirable side reactions in this process. Additionally, upon discharge, some lithium can be trapped in active components that are ionically or electrically isolated due to cracking or separation caused by volume change. This lithium loss decreases the capacity of the cell and reduces the cycle life.

It has also been surprisingly found that the use of nanoscale silicon as the anode active material leads to the formation of more vertical cracks as compared to solid-state anodes constructed with micro-scale silicon. When the cracks are horizontal or at an angle, as occurs frequently with micro-scale silicon, the flow of lithium ions from the solid-state electrolyte is disrupted causing a decrease in cell capacity and performance. By forming vertical cracks, the disruption to the flow of lithium is minimized and cell capacity and performance improves. Additionally, the vertical cracks allow for the silicon within the anode layer to expand and contract while maintaining intimate contact with the current collector and the electrolyte layer of the electrochemical cell.

Provided herein are anode layers for use in an electrochemical cell that are characterized by the formation of a plurality of vertical cracks having a thickness of less than or equal to 5 μm after a first cell cycle of the solid-state electrochemical cell. The anode layers include an active anode material, a solid-state electrolyte material, a conductive additive, and a binder. In some embodiments, the distance between each of the plurality of vertical cracks may be greater than or equal to 2 μm after a first cell cycle of the electrochemical cell. An electrochemical cell may have one or more anode layers, and corresponding cathode layers. The terms "anode" and "anode layer" are used interchangeably herein. In some embodiments, the electrochemical cell may comprise a solid-state electrolyte, a liquid electrolyte, or a gel electrolyte. In preferred embodiments, the electrochemical cell comprises a solid-state electrolyte.

As used herein "vertical" cracks refer to cracks that are substantially perpendicular in relation to a boundary—plane—between the anode and an adjacent anode current collector and that have few or no branches in the cracks. In some embodiments, the cracks may be oriented at a 90° angle±about 25° relative to the anode current collector; for example, the cracks may be oriented at an angle of about 65° to about 115°, about 70° to about 110°, about 80° to about 100°, about 85° to about 95°, about 80° to about 90°, about 85° to about 90°, about 90° to about 100°, or about 90° to about 95°. In some additional examples, the cracks may be oriented at an angle of about 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 90°, 91°, 92°, 93°, 94°, 95°, 96°, 97°, 98°, 99°, 100°, 101°, 102°, 103°, 104°, 105°, 106°, 107°, 108°, 109°, 110°, 111°, 112°, 113°, 114°, or about 115° relative to the anode current collector. In some additional embodiments, the cracks may be orthogonal to the anode current collector. The angle of the cracks may be determined through any method known in the art, such as SEM imaging.

The cracks that form in the anode layer begin as nano-fractures and grow in width as the electrode is charged and discharged. The width of the cracks can range from greater than 0 μm to about 5 μm. The areas of the anode composite between the cracks (referred to herein as "islands") can have a width and a length of greater than or equal to 20 μm. The height of the cracks and of the islands is equal to the thickness of the anode layer; i.e., about 1 μm to about 100 μm. The size of the cracks may be determined by SEM imaging.

In some embodiments, the anode may have a thickness of about 1 μm to about 100 μm. In some aspects, the anode layer may have a thickness of about 1 μm to about 10 μm, about 1 μm to about 20 μm, about 1 μm to about 30 μm, about 1 μm to about 40 μm, about 1 μm to about 50 μm, about 1 μm to about 60 μm, about 1 μm to about 70 μm, about 1 μm to about 80 μm, about 1 μm to about 90 μm, about 10 μm to about 100 μm, about 20 μm to about 100 μm, about 30 μm to about 100 μm, about 40 μm to about 100 μm, about 50 μm to about 100 μm, about 60 μm to about 100 μm, about 70 μm to about 100 μm, about 80 μm to about 100 μm, about 90 μm to about 100 μm, about 10 μm to about 50 μm, about 20 μm to about 40 μm, or about 20 μm to about 30 μm. In some additional aspects, the anode may have a thickness of about 1 μm, 5 μm, 10 μm, 20 μm, 30 μm, 40 μm, 50 μm, 60 μm, 70 μm, 80 μm, 90 μm, or about 100 μm. In an exemplary embodiment, the anode layer has a thickness of about 20 μm to about 30 μm.

The anode active material includes silicon having an average particle size of less than about 1000 nm. As used herein, "silicon" refers to silicon metal or an alloy thereof. The average particle size of the silicon may be described as the average particle diameter of the silicon ($D_{50}$). In some aspects, the silicon may have an average particle size of less than 500 nm, less than 450 nm, less than 400 nm, less than 350 nm, less than 300 nm, less than 250 nm, less than 200 nm, less than 150 nm, or less than 100 nm. In some examples, the silicon has an average particle size of about 300 nm. In some examples, the silicon has an average particle size of about 100 nm. In an exemplary embodiment, the silicon has an average particle size of about 50 nm to about 80 nm.

The silicon may have a surface area from about 1 $m^2/g$ to about 100 $m^2/g$. In some aspects, the silicon may have a surface area from about 1 $m^2/g$ to about 10 $m^2/g$, about 1 $m^2/g$ to about 20 $m^2/g$, about 1 $m^2/g$ to about 30 $m^2/g$, about 1 $m^2/g$ to about 40 $m^2/g$, about 10 $m^2/g$ to about 50 $m^2/g$, about 10 $m^2/g$ to about 60 $m^2/g$, about 10 $m^2/g$ to about 70 $m^2/g$, about 10 $m^2/g$ to about 80 $m^2/g$, about 10 $m^2/g$ to about 90 $m^2/g$, about 10 $m^2/g$ to about 100 $m^2/g$, about 20 $m^2/g$ to about 100 $m^2/g$, about 30 $m^2/g$ to about 100 $m^2/g$, about 40 $m^2/g$ to about 100 $m^2/g$, about 50 $m^2/g$ to about 100 $m^2/g$, about 60 $m^2/g$ to about 100 $m^2/g$, about 70 $m^2/g$ to about 100 $m^2/g$, about 80 $m^2/g$ to about 100 $m^2/g$, about 90 $m^2/g$ to about 100 $m^2/g$, about 10 $m^2/g$ to about 40 $m^2/g$, or about 20 $m^2/g$ to about 40 $m^2/g$. In some examples, the silicon has a surface area of about 30 $m^2/g$. In some additional examples, the silicon has a surface area of less than about 20 $m^2/g$.

The silicon may have a crystallite size from about 1 nm to about 50 nm. The crystallite size may be determined by applying the Scherrer equation or a Rietveld refinement to XRD patterns, as known to those having ordinary skill in the art. In some embodiments, the silicon may have a crystallite size from about 1 nm to about 5 nm, about 1 nm to about 10 nm, about 1 nm to about 20 nm, about 1 nm to about 30 nm, about 1 nm to about 40 nm, about 1 nm to about 50 nm, about 5 nm to about 50 nm, about 10 nm to about 50 nm, about 20 nm to about 50 nm, about 30 nm to about 50 nm, about 40 nm to about 50 nm, about 10 nm to about 40 nm, about 10 nm to about 30 nm, about 10 nm to about 20 nm, about 20 nm, to about 40 nm, or about 30 nm to about 40 nm. In some examples, the silicon may have a crystallite size of about 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, or about 50 nm.

The silicon may have a ratio of crystallite size to surface area (nm:$m^2$/g) from about 1:50 to about 50:1. For example, the ratio of crystallite size to surface area may be from about 1:50 to about 1:25, about 1:50 to about 1:10, about 1:50 to about 1:5, about 1:50 to about 1:2, about 1:50 to about 1:1, about 1:50 to about 2:1, about 1:50 to about 5:1, about 1:50 to about 10:1, about 1:50 to about 25:1, about 1:50 to about 50:1, about 1:25 to about 50:1, about 1:10 to about 50:1, about 1:5 to about 50:1, about 1:2 to about 50:1, about 1:1 to about 50:1, about 2:1 to about 50:1, about 5:1 to about 50:1, about 10:1 to about 50:1, or about 25:1 to about 50:1. The ratio of crystallite size to surface area may be about 1:50, 1:40, 1:30, 1:20, 1:10, 1:5, 1:2, 1:1, 2:1, 5:1, 10:1, 20:1, 30:1, 40:1, or about 50:1. In an exemplary embodiment, the ratio of crystallite size to surface area may be about 1:1. In another exemplary embodiment, the ratio of crystallite size to surface area may be about 1:2.

The silicon may have a ratio of crystallite size to particle size (nm:nm) from about 1:300 to about 1:1. For example, the ratio of crystallite size to particle size may be from about 1:300 to about 1:200, about 1:300 to about 1:100, about 1:300 to about 1:50, about 1:300 to about 1:20, about 1:300 to about 1:10, about 1:300 to about 1:5, about 1:300 to about 1:2, about 1:300 to about 1:1, about 1:300 to about 2:1, about 1:300 to about 5:1, about 1:300 to about 10:1, about 1:300 to about 20:1, about 1:300 to about 50:1, about 1:200 to about 50:1, about 1:100 to about 50:1, about 1:50 to about 50:1, about 1:20 toa bout 50:1, about 1:10 to about 50:1, about 1:5 to about 50:1, about 1:2 to about 50:1, about 1:1 to about 50:1, about 2:1 to about 50:1, about 5:1 to about 50:1, about 10:1 to about 50:1, or about 20:1 to about 50:1. The ratio of crystallite size to particle size may be about 1:300, 1:250, 1:200, 1:150, 1:100, 1:90, 1:80, 1:70, 1:60, 1:50, 1:40, 1:30, 1:20, 1:10, 1:5, 1:2, or about 1:1. In an exemplary embodiment, the ratio of crystallite size to particle size is about 1:18. In another exemplary embodiment, the ratio of crystallite size to particle size is about 13:50 (i.e., about 1:3.85).

The silicon may have a ratio of surface area to particle size ($m^2$/g:nm) from about 1:300 to about 50:10. For example, the ratio of surface area to particle size may be from about 1:300 to about 1:200, about 1:300 to about 1:100, about 1:300 to about 1:50, about 1:300 to about 1:20, about 1:300 to about 1:10, about 1:300 to about 1:5, about 1:300 to about 1:2, about 1:300 to about 1:1, about 1:300 to about 10:10, about 1:300 to about 20:10, about 1:300 to about 30:10, about 1:300 to about 40:10, about 1:300 to about 50:10, about 1:200 to about 50:10, about 1:100 to about 50:10, about 1:50 to about 50:10, about 1:20 to about 50:10, about 1:10 to about 50:10, about 1:5 to about 50:10, about 1:2 to about 50:10, about 1:1 to about 50:10, about 10:110 to about 50:10, about 20:10 to about 50:10, about 30:10 to about 50:10, or about 40:10 to about 50:1. The ratio of surface area to particle size may be about 1:300, 1:250, 1:200, 1:150, 1:100, 1:90, 1:80, 1:70, 1:60, 1:50, 1:40, 1:30, 1:20, 1:10, 1:5, 1:2, 1:1, 10:10, 20:10, 30:10, 40:10, or about 50:10. In an exemplary embodiment, the ratio of surface area to particle size is about 1:5. In another exemplary embodiment, the ratio of surface area to particle size is about 1:18.

Preferably, the anode of the present disclosure comprises less than 10 wt % $Li_{15}Si_4$ after lithiation in an electrochemical cell. For example, the composite anodes of the present disclosure may comprise less than 10 wt % $Li_{15}Si_4$, less than 9 wt % $Li_{15}Si_4$, less than 8 wt % $Li_{15}Si_4$, less than 7 wt %, $Li_{15}Si_4$, less than 6 wt % $Li_{15}Si_4$, less than 5 wt % $Li_{15}Si_4$, less than 4 wt % $Li_{15}Si_4$, less than 3 wt % $Li_{15}Si_4$, less than 2 wt % $Li_{15}Si_4$, or less than 1 wt % $Li_{15}Si_4$ after lithiation in an electrochemical cell.

The anode active material may be present in the anode layer in an amount from about 30% to about 98% by weight of the anode layer. In some aspects, the anode active material may be present in the anode layer in an amount from about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 30% to about 80%, about 30% to about 85%, about 30% to about 90%, about 30% to about 95%, about 35% to about 98%, about 40% to about 98%, about 45% to about 98%, about 50% to about 98%, about 55% to about 98%, about 60% to about 98%, about 65% to about 98%, about 70% to about 98%, about 75% to about 98%, about 80% to about 98%, about 85% to about 98%, about 90% to about 98%, about 40% to about 90%, about 40% to about 80%, about 40% to about 70%, about 40% to about 60%, about 40% to about 55%, about 40% to about 50%, or about 40% to about 45% by weight of the anode layer.

In other embodiments, the anode active material may be present in the anode layer in an amount of greater than or equal to about 30% by weight, or greater than or equal to about 40% by weight. In some aspects, the anode active material may be present in the anode layer in an amount of about 30% to about 70% by weight, about 40% to about 80% by weight, about 40% to about 75% by weight, about 40% to about 70% by weight, about 40% to about 65% by weight, or about 40% to about 60% by weight. In some examples, the anode active material is present in the anode layer in an amount of about 50% to about 60% by weight.

The anode active material may comprise a layer of oxide that forms on the outside of the anode active material. This oxide layer typically forms when the anode active material is in contact with the air. The oxide layer may have a thickness from about 3 nm to about 5 nm. The oxide layer may passivate the surface from further reaction with the air. Because the vertical cracks form after the cell is cycled, the vertical cracks may be devoid of the oxide layer or may be substantially free of the oxide layer, thereby increasing the total surface area of the anode layer. The oxide layer may be detectable using SEM.

Figure 14A:
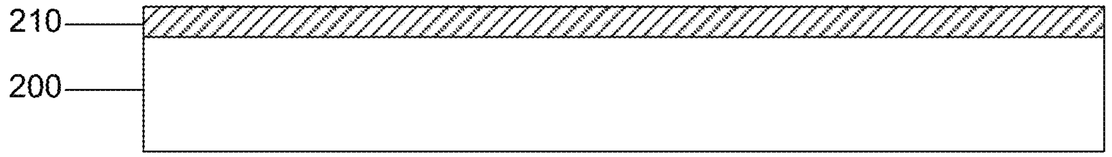
FIGS. 14A-14C shows a diagram of a silicon anode of the present disclosure including a silicon oxide coating.
Figure 14B:
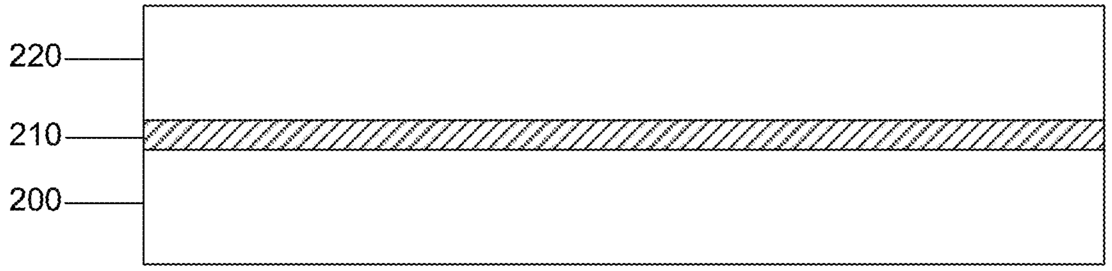
Figure 14C:
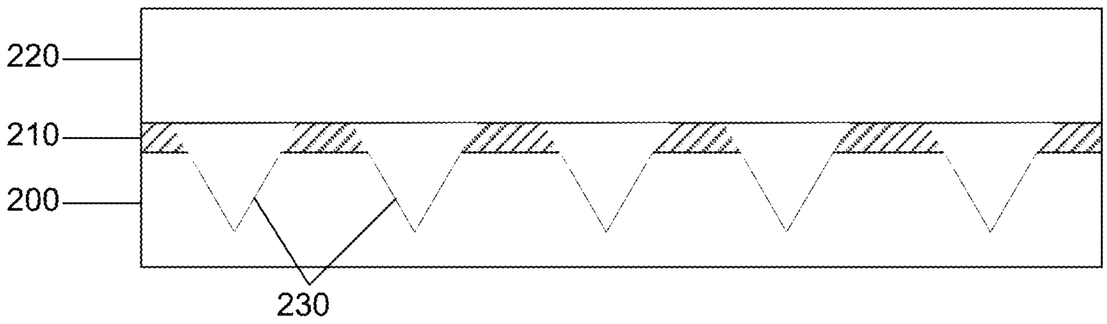

Referring now to FIGS. 14A-14C, the anode layer 200 may comprise a thin oxide layer 210 that forms on its surface. The anode layer 200 may be created by casting an anode slurry on a carrier foil and then removing the solvent from the slurry via a dryer. During the drying, the elevated temperature may increase the reactivity between the surface of the anode layer, the air, and moisture in the air. This creates the oxide layer 210 (also called a "passivation layer"). The electrolyte layer 220 is laminated on top of the anode layer 200 and the oxide layer 210. After cycling, the vertical cracks form in the anode layer 200 and in the oxide layer. Thus, the surface 230 of the vertical cracks in the anode layer 200 may be substantially free of the oxide layer 210 or may be entirely devoid of the oxide layer 210.

Currently, operation of electrochemical cells including solid-state batteries involves applying stack pressure to the battery as it charges and discharges. Stack pressure, sometimes also referred to as a force, involves application of a pressure to the cell to maintain contact between the respective electrodes and the solid electrolyte. In some aspects of the present disclosure, the stack pressure applied during a first cell-cycle or during a series of conditioning cycles of the electrochemical cell facilitates formation of vertical cracks. There may be two or more conditioning cycles in a series of conditioning cycles. The depth of discharge in each of the series of conditioning cycles may be equal or may be different between each of the conditioning cycles. The first cycle or the series of conditioning cycles may be part of a formation process prior to use of the battery to power a device. The voltage of each of the series of conditioning cycles may be constant or, in some embodiments, the voltage may be increased for each of the conditioning cycles.

The stack pressure applied during the first cell cycle or the series of conditioning cycles may be between about 100 psi to about 2500 psi. In some aspects, the stack pressure applied during the first cell cycle or the series of conditioning cycles may be about 100 psi to about 500 psi, about 500 psi to about 1000 psi, about 1000 psi to about 1500 psi, about 1500 psi to about 2000 psi, about 2000 psi to about 2500 psi, about 100 psi to about 1000 psi, about 100 psi to about 1500 psi, about 100 psi to about 2000 psi, about 500 psi to about 2500 psi, about 1000 psi to about 2500 psi, about 1500 psi to about 2500 psi, about 500 psi to about 2000 psi, or about 1000 psi to about 2000 psi. In some embodiments, the stack pressure applied during the first cell cycle or the series of conditioning cycles may be greater than 2500 psi. In an exemplary embodiment, the stack pressure applied during the first cell cycle or the series of conditioning cycles is about 1500 psi. In another exemplary embodiment, the stack pressure applied during the first cell cycle or the series of conditioning cycles is about 300 psi. In some embodiments, vertical cracks may still be formed in the absence of a stack pressure being applied.

The stack pressure may be lower than about 300 psi. In some embodiments, the stack pressure may be lower than about 300 psi, lower than about 250 psi, lower than about 200 psi, lower than bout 150 psi, lower than about 100 psi, lower than about 50 psi, lower than about 25 psi, or lower than about 10 psi.

In some embodiments, the stack pressure may remain constant throughout the life of the electrochemical cell. It has been observed that the distance between cracks does not change much after the first cell cycle if the stack pressure is not changed after the first cell cycle. In other embodiments, the stack pressure may be reduced or increased after one or more cell cycles. In some examples, the stack pressure is reduced after the first cell cycle. It has been observed that in some cases, reducing the stack pressure after a first cell cycle may cause the formation of new cracks, and thus change the overall spacing between cracks. In an exemplary embodiment, the maximum stack pressure may remain constant throughout the life of the electrochemical cell at 1500 psi. In another exemplary embodiment, the stack pressure may be about 1500 psi during the first cell cycle, and then the stack pressure is reduced to 300 psi for the remaining life of the electrochemical cell.

In one embodiment, the anode active material may further comprise one or more materials such as Tin (Sn), Germanium (Ge), graphite, $Li_4Ti_5O_{12}$ (LTO), hard carbons (e.g., amorphous carbon), other known anode active materials, and combinations thereof.

In some embodiments, the anode layer may further comprise one or more conductive additives. The conductive additive helps to evenly distribute the charge density throughout the anode. The conductive additives may include metal powders, fibers, filaments, or any other material known to conduct electrons. In some aspects, the one or more conductive additives may include one or more carbon-based conductive additives such as carbon fiber, graphite, graphene, carbon black, conductive carbon, amorphous carbon, VGCF, silicon-carbon composites, and carbon nanotubes.

In some embodiments, the conductive additive may be present in the anode layer in an amount from about 0% to about 15% by weight of the anode layer. In some aspects, the conductive additive may be present in the anode layer in an amount from about 0% to about 0.5%, about 0% to about 1%, about 0% to about 2%, about 0% to about 3%, about 0% to about 4%, about 0% to about 5%, about 0% to about 6%, about 0% to about 7%, about 0% to about 8%, about 0% to about 9%, about 0% to about 10%, about 0% to about 11%, about 0% to about 12%, about 0% to about 13%, about 0% to about 14%, about 0% to about 15%, about 0.5% to about 15%, about 1% to about 15%, about 2% to about 15%, about 3% to about 15%, about 4% to about 15%, about 5% to about 15%, about 6% to about 15%, about 7% to about 15%, about 8% to about 15%, about 9% to about 15%, about 10% to about 15%, about 11% to about 15%, about 12% to about 15%, about 13% to about 15%, or about 14% to about 15% by weight of the anode layer. In some aspects, the conductive additive may be present in the anode layer in an amount from about 0.1% to about 5% by weight of the anode layer, or from about 2% toa bout 5% by weight of the anode layer. In some additional aspects, the conductive additive may be present in the anode layer in an amount of about 0%, 0.1%, 0.2%, 0.3%, 0.4%, 0.5%, 0.6%, 0.7%, 0.8%, 0.9% 1%, 2%, 3%, 4%, 5%, 6%, 7%, 8%, 9%, 10%, 11%, 12%, 13%, 14%, or about 15% by weight of the anode layer.

In an exemplary embodiment, the conductive additive is present in the anode layer in an amount from about 0% to about 5% by weight of the anode layer. In other embodiments, the conductive additive may be present in the anode layer in an amount from about 0% to about 20% by weight, about 0% to about 30% by weight, about 0% to about 40% by weight, about 0% to about 50% by weight, or about 0% to about 60% by weight.

In some embodiments, the average particle size of the conductive additive may be from about 5 nm to about 100 nm. In some aspects, the average particle size of the conductive additive may be from about 5 nm to about 10 nm, about 5 nm to about 20 nm, about 5 nm to about 30 nm, about 5 nm to about 40 nm, about 5 nm to about 50 nm, about 5 nm to about 60 nm, about 5 nm to about 70 nm, about 5 nm to about 80 nm, about 5 nm to about 90 nm, about 10 nm to about 100 nm, about 20 nm to about 100 nm, about 30 nm to about 100 nm, about 40 nm to about 100 nm, about 50 nm to about 100 nm, about 60 nm to about 100 nm, about 70 nm to about 100 nm, about 80 nm to about 100 nm, about 90 nm to about 100 nm, about 10 nm to about 50 nm, or about 20 nm to about 40 nm. In some examples, the conductive additive may have a particle size of about 30 nm.

In some embodiments, the anode layer may further comprise one or more solid-state electrolyte materials. The solid-state electrolyte material, along with the conductive additive, helps to evenly distribute the charge density throughout the anode. The one or more solid-state electrolyte material may comprise an oxide, oxysulfide, sulfide, halide, nitride, or any other solid-state electrolyte known in the art. In some preferred embodiments, the one or more solid-state electrolyte materials may comprise a sulfide solid-state electrolyte material, i.e., a solid-state electrolyte having at least one sulfur component. In some embodiments, the one or more solid-state electrolytes may comprise one or more material combinations such as $Li_2S—P_2S_5$, $Li_2S—P_2S_5—LiI$, $Li_2S—P_2S_5—GeS_2$, $Li_{25}—P_2S_5—Li_2O$, $Li_2S—P_2S_5—Li_2O—LiI$, $Li_2S—$ $P_2S_5—LiI—LiBr$, $Li_2S—SiS_2$, $Li_2S—SiS_2—LiI$, $Li_2S—SiS_2—LiBr$, $Li_2S—S—SiS_2—LiCl$, $Li_2S—S—SiS_2—B_2S_3—Li$, $Li_2S—S—SiS_2—P_2S_5—Li$, $Li_2S—B_2S_3$, $Li_2S—P_2S_5\text{-}Z_mS_n$ (where m and n are positive numbers, and Z is Ge, Zn or Ga), $Li_2S—GeS_2$, $Li_2S—S—SiS_2—Li_3PO_4$, and $Li_2S—S—SiS_2—Li_xMO_y$ (where x and y are positive numbers, and M is P, Si, Ge, B, Al, Ga or In).

In another embodiment, the solid-state electrolyte material may be one or more of a $Li_3PS_4$, $Li_4P_2S_6$, $Li_7P_3S_{11}$, $Li_{10}GeP_2S_{12}$, $Li_{10}SnP_2S_{12}$. In a further embodiment, the solid-state electrolyte may be one or more of a $Li_6PS_5Cl$, $Li_6PS_5Br$, $Li_6PS_5I$ or expressed by the formula $Li_{7-y}PS_{6-y}X_y$ where "X" represents at least one halogen and/or at least one pseudo-halogen, and where $0<y\leq 2.0$ and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN. In yet another embodiment, the solid-state electrolyte material be expressed by the formula $Li_{8-y-z}P_2S_{9-y-z}X_yW_z$ (where "X" and "W" represents at least one halogen and/or at least one pseudo-halogen and where $0\leq y\leq 1$ and $0\leq z\leq 1$) and where the halogen may be one or more of F, C, Br, I, and the pseudo-halogen may be one or more of N, NH, $NH_2$, NO, $NO_2$, $BF_4$, $BH_4$, $AlH_4$, CN, and SCN.

In some aspects, the solid-state electrolyte material may be present in the anode layer in an amount from about 0% to about 60% by weight of the anode layer; for example, the solid-state electrolyte may be present in the anode layer in an amount from about 0% to about 10% by weight, about 0% to about 20% by weight, about 0% to about 30% by weight, about 0% to about 40% by weight, about 0% to about 50% by weight, about 10% to about 60% by weight, about 20% to about 60% by weight, about 30% to about 60% by weight, about 40% to about 60% by weight, or about 50% to about 60% by weight. In some aspects, the solid-state electrolyte material may be present in the anode layer in an amount from about 5%, 10%, 15%, 20%, 25%, 30%, 35%, 40%, 45%, 50%, 55%, or 60% by weight of the anode layer. In an exemplary embodiment, the solid-state electrolyte material is present in an amount from about 25% to about 55% by weight of the anode layer, or about 35% to about 45% by weight of the anode layer.

The anode layer may further comprise a binder. The binder aids in adhesion of the anode layer to the current collector and provides the anode layer with the necessary structural integrity to withstand the formation of cracks while keeping the components of the composite close enough to ensure electron/ion mobility. The binder may also form a flexible matrix when mixed with the solid-state electrolyte material. The binder may further allow the silicon active material and the conductive additive to be suspended in the electrolyte matrix, allowing the electrode layer to maintain particle-to-particle contact while the silicon material expands and contracts. In some embodiments, the binder may comprise fluororesin containing hexafluoropropylene (HFP), tetrafluoroethylene (TFE), and derivatives thereof as structural units. In some additional embodiments, the binder may comprise homopolymers such as polyhexafluoropropylene (PHFP) and the like. In another embodiment, the binder may be one or more of a thermoplastic elastomer such as but not limited to styrene-butadiene rubber (SBR), styrene-butadiene-styrene block copolymer (SBS), styrene-isoprene block copolymer (SIS), styrene-ethylene-butylene-styrene block copolymer (SEBS), polyacrylonitrile (PAN), nitrile-butylene rubber (NBR), polybutadiene, polyisoprene, poly (methacrylate) nitrile-butadiene rubber (PMMA-NBR), ethylene propylene diene monomer rubber (EPDM), and the like. In further embodiments, the binder may be one or more of a styrene-based thermoplastic, such as but not limited to styrene-butadiene rubber (SBR), styrene-butadiene-styrene block copolymer (SBS), styrene-isoprene block copolymer (SIS), polystyrene (PS), or styrene-ethylene-butylene-styrene block copolymer (SEBS).

In a further embodiment, the binder may comprise one or more of an acrylic resin such as but not limited to polymethyl(meth)acrylate, polyethyl(meth)acrylate, polyisopropyl (meth)acrylate polyisobutyl(meth)acrylate, polybutyl(meth) acrylate, and the like. In yet another embodiment, the binder may be one or more of a polycondensation polymer such as but not limited to polyurea, polyamide paper, polyimide, polyester, and the like. In yet a further embodiment, the binder may comprise one or more of a nitrile rubber such as but not limited to acrylonitrile-butadiene rubber (ABR), polystyrene nitrile-butadiene rubber (PS-NBR), and mixtures thereof.

In preferred embodiments, the binder may comprise a styrenic block copolymer or a styrene-based thermoplastic.

In some aspects, the binder may be present in the anode layer in an amount from about 0% to about 20% by weight of the anode layer; for example, the binder may be present in the anode layer in an amount from about 0% to about 5%, about 0% to about 10%, about 0% to about 15%, about 5% to about 20%, about 10% to about 20%, or about 15% to about 20%. In an exemplary embodiment, the binder is present in the anode layer in an amount from about 4% to about 5% by weight. In another exemplary embodiment, the binder is present in the anode layer in an amount of about 2% by weight.

Further provided herein is a solid-state electrochemical cell comprising an anode layer of the present disclosure, a cathode layer, and a solid-state electrolyte layer (i.e., a separator layer). The solid-state electrolyte layer is disposed between the anode layer and the cathode layer. In some embodiments, the solid-state electrochemical cell further comprises a first current collector layer and a second current collector layer, wherein the first current collector layer is disposed next to the anode layer and the second current collector layer is disposed next to the cathode layer.

Referring now to FIG. 1, the electrochemical cell of the present disclosure includes an anode layer 100 of the present disclosure, a solid-state electrolyte layer 102, a cathode layer 104, a first current collector layer 106, and a second current collector layer 108. The electrochemical cell of FIG. 1 exhibits vertical cracks 110. In one embodiment, the present invention comprises an anode layer, a solid-state electrolyte layer, a cathode layer, a first current collector layer, a second current collector layer, and/or substantial vertical cracks as depicted in one or more of FIG. 1, FIG. 3, FIG. 6, or FIG. 7. In another embodiment, the present invention comprises an anode layer, a solid-state electrolyte layer, a cathode layer, a first current collector layer, a second current collector layer, and/or substantially vertical cracks as depicted in one or more of FIGS. 11A-11E. In yet another embodiment, the present invention comprises an anode layer, a solid-state electrolyte layer, a cathode layer, a first current collector layer, a second current collector layer, and/or substantially vertical cracks as depicted in one or more of FIGS. 12A-12E. In yet another embodiment, the present invention comprises an anode layer and a first current collector layer, and/or substantially vertical cracks as depicted in one or more of FIG. 13A and FIG. 13C. The presence of substantially vertical cracks may be determined by any method known in the art, including but not limited to SEM imaging.

The cathode layer 104 may comprise a cathode active material such as ("NMC") nickel-manganese-cobalt which can be expressed as $Li(Ni_aCo_bMn_c)O_2$ ($0<a<1$, $0<b<1$, $0<c<1$, $a+b+c=1$) or, for example, NMC 111 ($LiNi_{0.33}Mn_{0.33}Co_{0.33}O_2$), NMC 433 ($LiNi_{0.4}Mn_{0.3}Co_{0.3}O_2$), NMC 532 ($LiNi_{0.5}Mn_{0.3}Co_{0.2}O_2$), NMC 622 ($LiNi_{0.6}Mn_{0.2}Co_{0.2}O_2$), NMC 811 ($LiNi_{0.8}Mn_{0.1}Co_{0.1}O_2$) or a combination thereof. In another embodiment, the cathode active material may comprise one or more of a coated or uncoated metal oxide, such as but not limited to $V_2O_5$, $V_6O_{13}$, $MoO_3$, $LiCoO_2$, $LiNiO_2$, $LiMnO_2$, $LiMn_2O_4$, $LiNi_{1-Y}CO_YO_2$, $LiCo_{1-Y}Mn_YO_2$, $LiNi_{1-Y}Mn_YO_2$ ($0\leq Y<1$), $Li(Ni_aCO_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ ($0<Z<2$), $LiCoPO_4$, $LiFePO_4$, CuO, $Li(Ni_aCo_bAl_c)O_2$ ($0<a<1$, $0<b<1$, $0<c<1$, $a+b+c=1$) or a combination thereof. In yet another embodiment, the cathode active material may comprise one or more of a coated or uncoated metal sulfide such as but not limited to titanium sulfide ($TiS_2$), molybdenum sulfide ($MoS_2$), iron sulfide (FeS, $FeS_2$), copper sulfide (CuS), and nickel sulfide ($Ni_3S_2$) or combinations thereof. In another embodiment, the cathode active material may comprise one or more of a metal fluoride, such as but not limited to iron fluoride ($FeF_2$, $FeF_3$), copper fluoride ($CuF_2$), zinc fluoride ($ZnF_2$), titanium fluoride ($TiF_4$), and nickel fluoride ($NiF_2$).

The cathode layer 104 may comprise one or more conductive additives. The conductive additives may include metal powders, fibers, filaments, or any other material known to conduct electrons. In some aspects, the one or more conductive additives may include one or more conductive carbon materials such as carbon fiber, graphite, graphene, carbon black, conductive carbon, amorphous carbon, VGCF, silicon-carbon composites, and carbon nanotubes. In some aspects, the conductive additive may be present in the cathode layer 104 in an amount from about 1% to about 10%.

The cathode layer 104 may comprise one or more solid-state electrolytes. The one or more solid-state electrolyte may comprise an oxide, oxysulfide, sulfide, halide, nitride, or any other solid-state electrolyte known in the art. In some preferred embodiments, the one or more solid-state electrolytes may comprise a sulfide solid-state electrolyte. In some embodiments, the solid-state electrolyte comprises one or more material combinations such as $Li_2S—P_2S_5$, $Li_2S—P_2S_5—LiI$, $Li_2S—P_2S_5—GeS_2$, $Li_2S—P_2S_5—Li_2O$, $Li_2S—P_2S_5—Li_2O—LiI$, $Li_2S—P_2S_5—LiI—LiBr$, $Li_2S—SiS_2$, $Li_2S—SiS_2—LiI$, $Li_2S—SiS_2—LiBr$, $Li_2S—S—SiS_2—LiCl$, $Li_2S—S—SiS_2—B_2S_3—LiI$, $Li_2S—S—SiS_2—P_2S_5—LiI$, $Li_2S—B_2S_3$, $Li_2S—P_2S_5\text{-}Z_mS_n$ (where m and n are positive numbers, and Z is Ge, Zn or Ga), $Li_2S—GeS_2$, $Li_2S—S—SiS_2—Li_3PO_4$, and $Li_2S—S—SiS_2—Li_xMO_y$ (where x and y are positive numbers, and M is P, Si, Ge, B, Al, Ga or In). In another embodiment, the solid-state electrolyte may be one or more of a $Li_3PS_4$, $Li_4P_2S_6$, $Li_7P_3S_{11}$, $Li_{10}GeP_2S_{12}$, $Li_{10}SnP_2S_{12}$. In a further embodiment, the solid-state electrolyte may be one or more of a $Li_6PS_5Cl$, $Li_6PS_5Br$, $Li_6PS_5I$ or expressed by the formula $Li_{7-y}PS_{6-y}X_y$ where "X" represents at least one halogen and/or at least one pseudo-halogen, where $0<y\leq 2.0$, and where the at least one halogen may be one or more of F, Cl, Br, I, and the at least one pseudo-halogen may be one or more of N, NH, $NH_2$, NO, $NO_2$, $BF_4$, $BH_4$, $AlH_4$, CN, and SCN. In yet another embodiment, the solid-state electrolyte be expressed by the formula $Li_{8-y-z}P_2S_{9-y-z}X_yW_z$ (where "X" and "W" represents at least one halogen elements and or pseudo-halogen and where $0\leq y\leq 1$ and $0\leq z\leq 1$) and where a halogen may be one or more of F, Cl, Br, I, and a pseudo-halogen may be one or N, NH, $NH_2$, NO, $NO_2$, $BF_4$, $BH_4$, $AlH_4$, CN, and SCN. In some aspects, the solid state electrolyte may be present in the cathode layer 104 in an amount from about 5% to about 20%.

The cathode layer 104 may comprise one or more of a binder. In some embodiments, the binder may include fluororesin containing vinylidene fluoride (VdF), hexafluoropropylene (HFP), tetrafluoroethylene (TFE), and derivatives thereof as structural units. Specific examples thereof include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the binder may be one or more of a thermoplastic elastomer such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, Poly (methacrylate) nitrile-butadiene rubber (PMMA-NBR) and the like. In a further embodiment, the binder may be one or more of an acrylic resin such as but not limited to polymethyl (meth) acrylate, polyethyl (meth) acrylate, polyisopropyl (meth) acrylate polyisobutyl (meth) acrylate, polybutyl (meth) acrylate, and the like. In yet another embodiment, the binder may be one or more of a polycondensation polymer such as but not limited to polyurea, polyamide paper, polyimide, polyester, and the like. In yet a further embodiment, the binder may be one or more of a nitrile rubber such as but not limited to acrylonitrile-butadiene rubber (ABR), polystyrene nitrile-butadiene rubber (PS-NBR), ethylene propylene diene monomer rubber (EPDM), and mixtures thereof. In some embodiments, the binder may comprise one or more rheology modifying components. In some preferred embodiments, when the binder comprises one or more rheology modifying components, the binder further comprises one or more additional binders or polymers that are not rheology modifying components. In some aspects, the binder may be present in the cathode layer 104 in an amount from about 0% to about 5%.

The electrolyte layer 102 (also referred to herein as the "separator layer") may comprise one or more solid-state electrolytes. The one or more solid-state electrolytes may comprise an oxide, oxysulfide, sulfide, halide, nitride, or any other solid-state electrolyte known in the art. In some preferred embodiments, the one or more solid-state electrolytes may comprise a sulfide solid-state electrolyte. In some aspects, the one or more sulfide solid-state electrolyte may comprise one or more material combinations such as $Li_2S—P_2S_5$, $Li_2S—P_2S_5—LiI$, $Li_2S—P_2S_5—GeS_2$, $Li_2S—P_2S_5—Li_2O$, $Li_2S—P_2S_5—Li_2O\text{-}LiI$, $Li_2S—P_2S_5—LiI—LiBr$, $Li_2S—SiS_2$, $Li_2S—SiS_2—LiI$, $Li_2S—SiS_2—LiBr$, $Li_2S—S—SiS_2—LiCl$, $Li_2S—S—SiS_2—B_2S_3—LiI$, $Li_2S—S—SiS_2—P_2S_5—LiI$, $Li_2S—B_2S_3$, $Li_2S—P_2S_5—Z_mS_n$ (where m and n are positive numbers, and Z is Ge, Zn or Ga), $Li_2S—GeS_2$, $Li_2S—S—SiS_2—Li_3PO_4$, and $Li_2S—S—SiS_2—Li_xMO_y$ (where x and y are positive numbers, and M is P, Si, Ge, B, Al, Ga or In). In some embodiments, one or more of the solid electrolyte materials may be $Li_3PS_4$, $Li_4P_2S_6$, $Li_7P_3S_{11}$, $Li_{10}GeP_2S_{12}$, $Li_{10}SnP_2S_{12}$, and combinations thereof. In another embodiment, one or more of the solid electrolyte materials may be $Li_6PS_5Cl$, $Li_6PS_5Br$, $Li_6PS_5I$ or expressed by the formula $Li_{7-y}PS_{6-y}X_y$, where "X" represents at least one halogen and/or at least one pseudo-halogen, where $0<y\leq 2.0$, and where the halogen may be one or more of F, Cl, Br, I, and combinations thereof, and the pseudo-halogen may be one or more of N, NH, $NH_2$, NO, $NO_2$, $BF_4$, $BH_4$, $AlH_4$, CN, SCN, and combinations thereof. In another embodiment, one or more of the solid electrolyte materials may be expressed by the formula $Li_{8-y-z}P_2S_{9-y-z}X_yW_z$ (where "X" and "W" represents at least one halogen and/or at least one pseudo-halogen and where $0\leq y\leq 1$ and $0\leq z\leq 1$) and where the halogen may be one or more of F, C, Br, I, and the pseudo-halogen may be one or more of N, NH, $NH_2$, NO, $NO_2$, $BF_4$, $BH_4$, $AlH_4$, CN, SCN, and combinations thereof.

The electrolyte layer 102 may further comprise one or more of a binder. In some embodiments, the binder may include fluororesin containing vinylidene fluoride (VdF), hexafluoropropylene (HFP), tetrafluoroethylene (TFE), and derivatives thereof as structural units. Specific examples thereof may include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the binder may be one or more of a thermoplastic elastomer, such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, poly (methacrylate) nitrile-butadiene rubber (PMMA-NBR) and the like. In a further embodiment, the binder may be one or more of an acrylic resin such as but not limited to polymethyl(meth)acrylate, polyethyl(meth) acrylate, polyisopropyl(meth)acrylate polyisobutyl(meth) acrylate, polybutyl(meth)acrylate, and the like. In yet another embodiment, the binder may be one or more of a polycondensation polymer such as but not limited to polyurea, polyamide paper, polyimide, polyester, and the like. In yet a further embodiment, the binder may be one or more of a nitrile rubber such as but not limited to acrylonitrile-butadiene rubber (ABR), polystyrene nitrile-butadiene rubber (PS-NBR), ethylene propylene diene monomer rubber (EPDM), and mixtures thereof. In some embodiments, the binder may comprise one or more rheology modifying components. In some preferred embodiments, when the binder comprises one or more rheology modifying components, the binder further comprises one or more additional binders or polymers that are not rheology modifying components. In some aspects, the binder may be present in the electrolyte layer 102 in an amount from about 0% to about 20% by weight.

In some embodiments, the electrolyte layer 102 may have a thickness from about 10 μm to about 40 μm. In some aspects, the electrolyte layer 102 may have a thickness from about 10 μm to about 20 μm, about 10 μm to about 30 μm, about 20 μm to about 30 μm, about 20 μm to about 40 μm, or about 30 μm to about 40 μm. In some additional aspects, the electrolyte layer 102 may have a thickness of about 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, or about 40 μm.

The first current collector 106 and the second current collector 108 may comprise one or more of copper, aluminum, nickel, titanium, stainless steel, magnesium, iron, zinc, indium, germanium, silver, platinum, or gold. The first current collector and/or the second current collector may further comprise a carbon coating adjacent to the anode layer or the cathode layer. In some embodiments, the first current collector 106 or the second current collector 108 may have a thickness from about 5 μm to about 10 μm. In preferred embodiments, the first current collector 106 comprises copper, nickel, and/or steel.

In general, when a higher stack pressure is applied during the first cell cycle, the electrochemical cell may have a greater capacity retention as compared to an electrochemical cell having less stack pressure applied during the first cell cycle. Without wishing to be bound by theory, the increased stack pressure improves the contact between particles and layers, lowers resistance, and promotes the formation of vertical cracks. However, if the stack pressure is too high, the cell may short.

In some embodiments, the electrochemical cells of the present disclosure have an increased retention capacity compared to cells having an anode layer comprising microscale silicon. In some embodiments, the electrochemical cell may have a capacity retention of about 80% or greater after 100 cycles or more; for example, the electrochemical cell may have a capacity retention of about 80% or greater after about 100 cycles or more, 200 cycles or more, 300 cycles or more, 400 cycles or more, 500 cycles or more, 600 cycles or more, 700 cycles or more, 800 cycles or more, 900 cycles or more, or 1000 cycles or more.

In some embodiments, the electrochemical cells of the present disclosure comprise: a current collector; and, an anode layer, the anode layer comprising silicon or an alloy thereof, at least one solid electrolyte material, and at least one binder material; and, further wherein within the electrochemical cell there is no physical separation or lift-off between the current collector and anode layer after 5 cycles or more; for example, 10 cycles, 25 cycles, 50 cycles, 75 cycles, 100 cycles, 200 cycles, 300 cycles, 400 cycles, 500 cycles, 600 cycles, 700 cycles, 800 cycles, 900 cycles, 1000 cycles, or more than about 1000 cycles.

Also provided herein is a method of preparing an anode layer for use in a solid-state electrochemical cell. The method may comprise: a) mixing a silicon or an alloy thereof, at least one solid electrolyte material, at least one binder material, and a solvent to form a slurry; b) casting the slurry onto a substrate; and c) drying the slurry to form the anode layer.

In some embodiments, the solvent may be selected from but is not limited to one or more of the following: aprotic hydrocarbons, esters, ethers, nitriles, or combinations thereof. In another aspect, the aprotic hydrocarbons may be selected from but are not limited to one of the following: xylenes, toluene, benzene, methyl benzene, hexanes, heptane, octane, alkanes, isoparaffinic hydrocarbons or a combination thereof. In another aspect, the esters may be selected from but are not limited to one of the following: butyl butyrate, isobutyl isobutyrate methyl propionate, ethyl propionate, propyl propionate, butyl propionate, methyl acetate, ethyl acetate, propyl acetate, butyl acetate or a combination thereof. In another aspect, the ethers may be selected from but are not limited to one of the following:

diethyl ether, dibutyl ether, benzyl ether or a combination thereof. In another aspect, the nitriles may be selected from but are not limited to one of the following: acetonitrile, propionitrile, butyronitrile, pyrrolidine or a combination thereof.

After the anode layer is dried on the substrate, the anode is densified to increase the density of the anode layer. Methods of densification are well-known to those having skill in the art. In preferred embodiments, the densification is accomplished by calendering or by pressing, e.g., with a linear press. In some embodiments, the temperature during densification may be about 80° C. to about 140° C. It will be appreciated that the density of the anode layer will depend on the formulation of the anode layer as well as the densification conditions. Without wishing to be bound by theory, increasing the density of the anode layer reduces the porosity of the anode layer, thereby improving contacts between particles and lowering the resistance of the anode layer.

In some embodiments, the density of the anode layer after densification may be from about 1 $g/cm^3$ to about 1.75 $g/cm^3$; for example, the density of the anode layer after densification may be about 1 $g/cm^3$, 1.05 $g/cm^3$, 1.1 $g/cm^3$, 1.15 $g/cm^3$, 1.2 $g/cm^3$, 1.25 $g/cm^3$, 1.3 $g/cm^3$, 1.35 $g/cm^3$, 1.4 $g/cm^3$, 1.45 $g/cm^3$, 1.5 $g/cm^3$, 1.55 $g/cm^3$, 1.6 $g/cm^3$, 1.65 $g/cm^3$, 1.7 $g/cm^3$, or about 1.75 $g/cm^3$. In another example, the density of the anode layer after densification may be from about 1 $g/cm^3$ to about 1.1 $g/cm^3$, about 1 $g/cm^3$ to about 1.2 $g/cm^3$, about 1 $g/cm^3$ to about 1.3 $g/cm^3$, about 1 $g/cm^3$ to about 1.4 $g/cm^3$, about 1 $g/cm^3$ to about 1.5 $g/cm^3$, about 1 $g/cm^3$ to about 1.6 $g/cm^3$, about 1 $g/cm^3$ to about 1.7 $g/cm^3$, about 1.1 $g/cm^3$ to about 1.75 $g/cm^3$, about 1.2 $g/cm^3$ to about 1.75 $g/cm^3$, about 1.3 $g/cm^3$ to about 1.75 $g/cm^3$, about 1.4 $g/cm^3$ to about 1.75 $g/cm^3$, about 1.5 $g/cm^3$ to about 1.75 $g/cm^3$, about 1.6 $g/cm^3$ to about 1.75 $g/cm^3$, or about 1.7 $g/cm^3$ to about 1.75 $g/cm^3$.

Further provided herein is an anode layer composition comprising an anode active material, a solid-state electrolyte material, a conductive additive, and a binder, wherein the composition has a density from about 1 $g/cm^3$ to about 1.75 $g/cm^3$. The anode active material, solid-state electrolyte material, conductive additive, and the binder may be selected from any of the materials identified earlier in the present disclosure and in any amounts defined earlier in the present disclosure. In some embodiments, the composition may be subjected to a stack pressure from about 100 psi to about 2500 psi, or greater than 2500 psi.

In an exemplary embodiment, an anode layer of the present disclosure comprises silicon in an amount of about 85% by weight of the anode layer, a conductive additive in an amount of about 10% by weight of the anode layer, and a binder in an amount of about 5% by weight of the anode layer.

In another exemplary embodiment, an anode layer of the present disclosure comprises silicon in an amount from about 48% to about 52% by weight of the anode layer, a binder in an amount from about 2% to about 6% by weight of the anode layer, a carbon-based conductive additive in an amount from about 3% to about 7% by weight of the anode layer, and a solid-state electrolyte in an amount from about 39% to about 43% by weight of the anode layer.

Exemplary Embodiments

Embodiment 1: An anode layer for use in an electrochemical cell, the anode layer comprising:

an anode active material comprising silicon having an average particle size of less than 1 μm, wherein the anode active material is present in an amount of greater than or equal to 40% by weight of the anode layer; and a carbon-based conductive additive, wherein the anode layer is characterized by the formation of a plurality of vertical cracks having a thickness of less than or equal to 10 μm after a first cell cycle or a series of conditioning cycles.

Embodiment 2: The anode layer of embodiment 1, wherein the distance between each of the plurality of cracks is greater than or equal to 2 μm after the first cell cycle or the series of conditioning cycles of the electrochemical cell.

Embodiment 3: The anode layer of embodiment 1 or 2, wherein a stack pressure of about 100 psi to about 2500 psi is applied during the first cell cycle or the series of conditioning cycles.

Embodiment 4: The anode layer of embodiment 3, wherein a stack pressure of about 300 psi to about 1500 psi is applied during the first cell cycle or the series of conditioning cycles.

Embodiment 5: The anode layer of embodiment 4, wherein a stack pressure of about 1500 psi is applied during the first cell cycle or the series of conditioning cycles.

Embodiment 6: The anode layer of any one of embodiments 1-5, wherein the silicon has an average particle size of less than 300 nm.

Embodiment 7: The anode layer of any one of embodiments 1-6, wherein the carbon-based conductive additive is present in an amount from about 0% to about 15% by weight of the anode layer.

Embodiment 8: The anode layer of any one of embodiments 1-7, wherein the carbon-based conductive additive is present in an amount from about 0% to about 5% by weight of the anode layer.

Embodiment 9: The anode layer of any one of embodiments 1-8, further comprising a solid-state electrolyte material.

Embodiment 10: The anode layer of embodiment 9, wherein the solid-state electrolyte material is present in an amount from about 0% to about 50% by weight of the anode layer.

Embodiment 11: The anode layer of embodiment 10, wherein the solid-state electrolyte material is present in an amount of about 25% to about 55% by weight of the anode layer.

Embodiment 12: The anode layer of embodiment 9, wherein the solid-state electrolyte material comprises a sulfide solid-state electrolyte material.

Embodiment 13: The anode layer of any one of embodiments 1-12, wherein the binder is present in an amount from about 0% to about 20% by weight of the anode layer.

Embodiment 14: The anode layer of embodiment 13, wherein the binder is present in an amount from about 4% to about 5% by weight of the anode layer.

Embodiment 15: The anode layer of any one of embodiments 1-14, wherein the binder comprises one or more styrenic block copolymers or one or more styrene-based thermoplastics.

Embodiment 16: The anode layer of embodiment 15, wherein the binder is selected from the group consisting of styrene-butadiene-styrene block copolymer (SBS), styrene-ethylene-butylene-styrene block copolymer (SEBS), ethylene propylene diene monomer rubber (EPDM), polystyrene (PS), styrene-isoprene block copolymer (SIS), and combinations thereof.

Embodiment 17: The anode layer of any one of embodiments 1-16, wherein the anode layer is coated on a current collector.

Embodiment 18: The anode layer of embodiment 17, wherein the current collector comprises one or more of copper, nickel, and steel.

Embodiment 19: The anode layer of any one of embodiments 1-18, wherein the anode layer has a thickness from about 1 μm to about 100 μm.

Embodiment 20: The anode layer of embodiment 19, wherein the anode layer has a thickness from about 10 μm to about 50 μm.

Embodiment 21: The anode layer of any one of embodiments 1-20, wherein the anode active material is present in the anode layer in an amount from about 40% to about 85% by weight of the anode layer.

Embodiment 22: The anode layer of embodiment 21, wherein the anode active material is present in the anode layer in an amount from about 40% to about 60% by weight of the anode layer.

Embodiment 23: The anode layer of any one of embodiments 1-22, wherein the silicon comprises particles having a surface area of about 1 $m^2/g$ to about 50 $m^2/g$.

Embodiment 24: A method of making the anode layer of embodiment 1, the method comprising:

a) mixing a silicon or an alloy thereof, at least one solid electrolyte material, at least one binder material, and a solvent to form a slurry;

b) casting the slurry onto a substrate; and c) drying the slurry to form the anode layer.

Embodiment 25: The method of embodiment 24, wherein the method further comprises calendering the anode layer.

Embodiment 26: The method of embodiment 25, wherein the calendering occurs at a temperature from about 80° C. to about 140° C.

Embodiment 27: The method of any one of embodiments 24-26, wherein the solvent is added to the silicon or alloy thereof, the at least one solid electrolyte material, and the at least one binder material while mixing.

Embodiment 28: The method of any one of embodiments 24-27, wherein the solvent is added to the silicon or alloy thereof, the at least one solid electrolyte material, and the at least one binder material before mixing.

Embodiment 29: The method of any one of embodiments 24-28, wherein the solvent comprises aprotic hydrocarbons, esters, ethers, nitriles, or combinations thereof.

Embodiment 30: An electrochemical cell comprising the anode layer of any one of embodiments 1-23.

Embodiment 31: The electrochemical cell of embodiment 30, wherein the electrochemical cell has a capacity retention of about 80% after 100 cycles or more.

Embodiment 32: The electrochemical cell of embodiment 31, wherein the electrochemical cell has a capacity retention of about 80% after 500 cycles or more.

Embodiment 33: The electrochemical cell of embodiment 32, wherein the electrochemical cell has a capacity retention of about 80% after 1000 cycles or more.

Embodiment 34: An anode layer for use in an electrochemical cell, the anode layer comprising:

an anode active material comprising silicon having an average particle size of less than 1 μm, wherein the anode active material is present in an amount of greater than or equal to 40% by weight of the anode layer;

a carbon-based conductive additive; and a solid electrolyte material, wherein the anode layer is characterized by the formation of a plurality of vertical cracks having a thickness of less than or equal to 10 μm after a first cell cycle or a series of conditioning cycles.

Embodiment 35: An anode composition comprising:

an anode active material comprising silicon having an average particle size of less than 1 μm, wherein the anode active material is present in an amount of about 30% to about 70% by weight of the anode layer;

a carbon-based conductive additive present in an amount of greater than about 0% to about 15% by weight of the anode layer;

a solid electrolyte material present in an amount of about 25% to about 55% by weight of the anode layer; and a binder present in an amount of greater than about 0% to about 20% by weight of the anode layer.

Embodiment 36: The composition of embodiment 35, wherein the carbon-based conductive additive is present in an amount from about 0.1% to about 5% by weight of the composition.

Embodiment 37: The composition of embodiment 35 or 36, wherein the solid-state electrolyte material is present in an amount from about 35% to about 45% by weight of the composition.

Embodiment 38: The composition of any one of embodiments 35-37, wherein the binder is present in an amount of about 4% to about 5% by weight of the composition.

Embodiment 39: The composition of any one of embodiments 35-38, wherein the binder comprises one or more styrenic block copolymers or one or more styrene-based thermoplastics.

Embodiment 40: The composition of embodiment 39, wherein the binder is selected from the group consisting of styrene-butadiene-styrene block copolymer (SBS), styrene-ethylene-butylene-styrene block copolymer (SEBS), ethylene propylene diene monomer rubber (EPDM), polystyrene (PS), styrene-isoprene block copolymer (SIS), and combinations thereof.

Embodiment 41: The composition of any one of embodiments 35-40, wherein the anode active material is present in the anode layer in an amount of about 50% to about 60% by weight of the composition.

Embodiment 42: The composition of any one of embodiments 35-41, wherein the silicon comprises particles having a surface area of about 1 $m^2/g$ to about 50 $m^2/g$.

Embodiment 43: The composition of any one of embodiments 35-42, wherein the composition is characterized by the formation of a plurality of vertical cracks having a thickness of less than or equal to 5 μm after a first cell cycle or a series of conditioning cycles.

Unless defined otherwise, all technical and scientific terms used herein have the same meaning as commonly understood by those of ordinary skill in the art to which the disclosure belongs. Although any methods and materials similar or equivalent to those described herein can be used in the practice or testing of the subject matter of the present disclosure, preferred methods and materials are described. For the purposes of the present disclosure, the following terms are defined below.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 2 to about 50" should be interpreted to include not only the explicitly recited values of 2 to 50, but also include all individual values and sub-ranges within the indicated range. Thus, included in this numerical range are individual values such as 2, 2.4, 3, 3.7, 4, 5.5, 10, 10.1, 14, 15, 15.98, 20, 20.13, 23, 25.06, 30, 35.1, 38.0, 40, 44, 44.6, 45, 48, and sub-ranges such as from 1-3, from 2-4, from 5-10, from 5-20, from 5-25, from 5-30, from 5-35, from 5-40, from 5-50, from 2-10, from 2-20, from 2-30, from 2-40, from 2-50, etc. This same principle applies to ranges reciting only one numerical value as a minimum or a maximum. Furthermore, such an interpretation should apply regardless of the breadth of the range or the characteristics being described.

The term "about" will be understood by persons of ordinary skill in the art and will vary to some extent on the context in which it is used. As used herein when referring to a measurable value such as an amount, a temporal duration, and the like, the term "about" is meant to encompass variations of +10%, including ±5%, 1%, and ±0.1% from the specified value, as such variations are appropriate to perform the disclosed methods.

In this disclosure, "comprises," "comprising," "containing," and "having" and the like can have the meaning ascribed to them in U.S. Patent Law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. In this specification when using an open ended term, like "comprising" or "including," it is understood that direct support should be afforded also to "consisting essentially of" language as well as "consisting of" language as if stated explicitly and vice versa.

EXAMPLES

Examples have been set forth below for the purpose of illustration and to describe certain specific embodiments of the disclosure. However, the scope of the claims is not to be in any way limited by the examples set forth herein. Various changes and modifications to the disclosed embodiments will be apparent to those skilled in the art and such changes and modifications including, without limitation, those relating to the chemical structures, substituents, derivatives, formulations, or methods of the disclosure may be made without departing from the spirit of the disclosure and the scope of the appended claims. Definitions of the variables in the structures in the schemes herein are commensurate with those of corresponding positions in the formulae presented herein.

Example 1: Crack Formation Based on Particle Size

Electrochemical cells comprising anode layers of the present disclosure were prepared and imaged using scanning electron microscopy. The SEM images are shown in FIGS. 1-4. The particle size range, the composition, and the cracking type are described for each of the silicon anode samples in Table 1. The same styrene-based thermoplastic was used in each anode layer composition. The stack pressure applied during the first cell cycle for each of the samples in Table 1 was 300 psi.

TABLE 1

| # | FIG. | Particle Size | Anode Layer Composition | Cracking Type |
|---|---|---|---|---|
| 1 | 1 | 50-80 nm | 50% silicon, 4% styrene-based thermoplastic, 5% carbon, 41% SSE | Vertical |
| 2 | 2 | 1.3-7.6 μm | 50% silicon, 4% styrene-based thermoplastic, 5% carbon, 41% SSE | Random; Follows surface of particles |
| 3 | 3 | 50-80 nm | 50% silicon, 7% styrene-based thermoplastic, 5% carbon, 38% SSE | Vertical |
| 4 | 4 | 1.27-9 μm | 50% silicon, 7% styrene-based thermoplastic, 5% carbon, 38% SSE | Random; Follows surface of particles |

Figure 5:
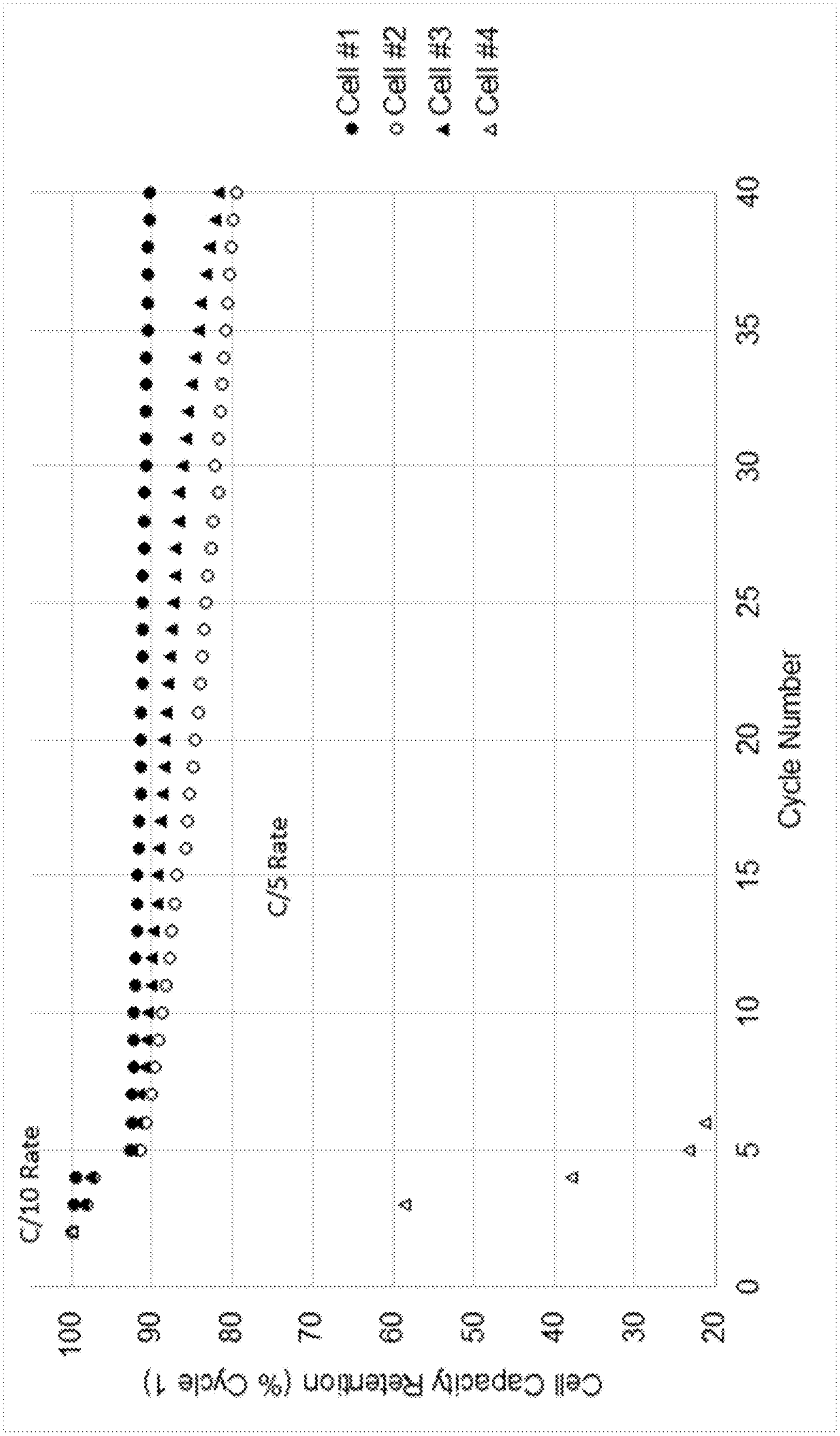
FIG. 5 shows the cycling data for the electrochemical cells shown in FIGS. 1-4.
Figure 6:
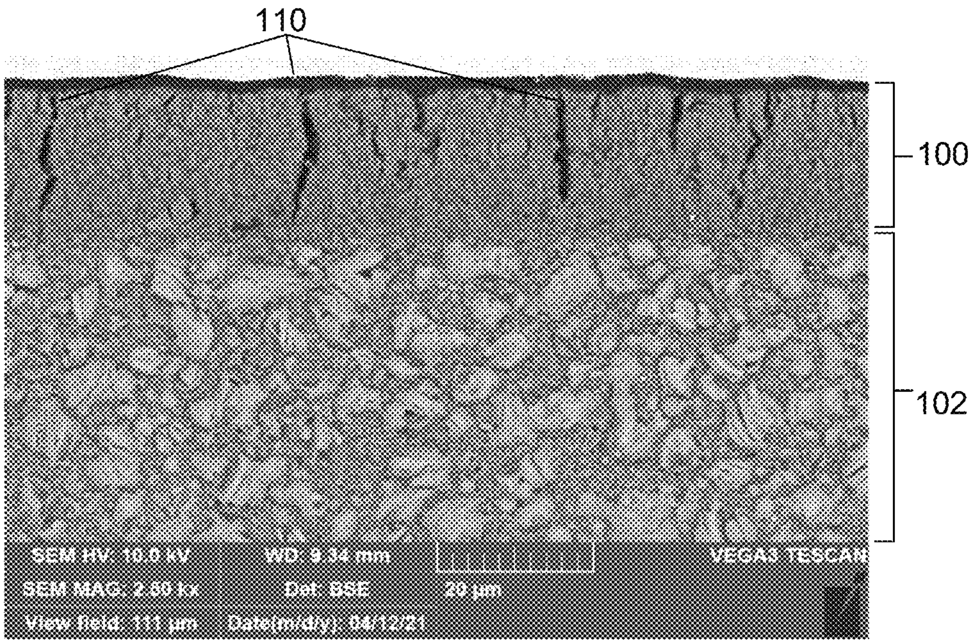
FIG. 6 shows a scanning electron micrograph of an electrochemical cell including an anode layer comprising silicon having an average particle size of about 50-80 nm and a stack pressure of 1500 psi.
Figure 7:
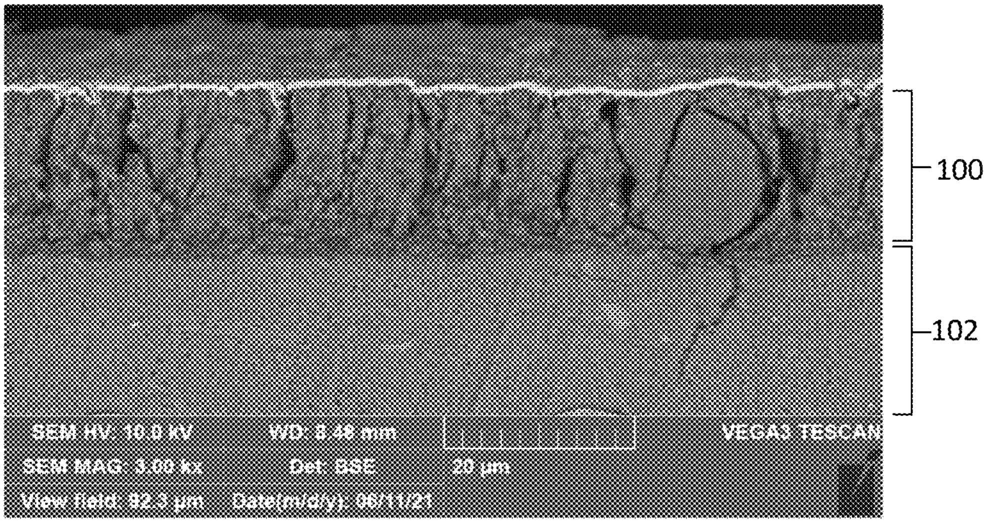
FIG. 7 shows a scanning electron micrograph of an electrochemical cell including an anode layer comprising silicon having an average particle size of about 300 nm and a stack pressure of 1500 psi.
Figure 8:
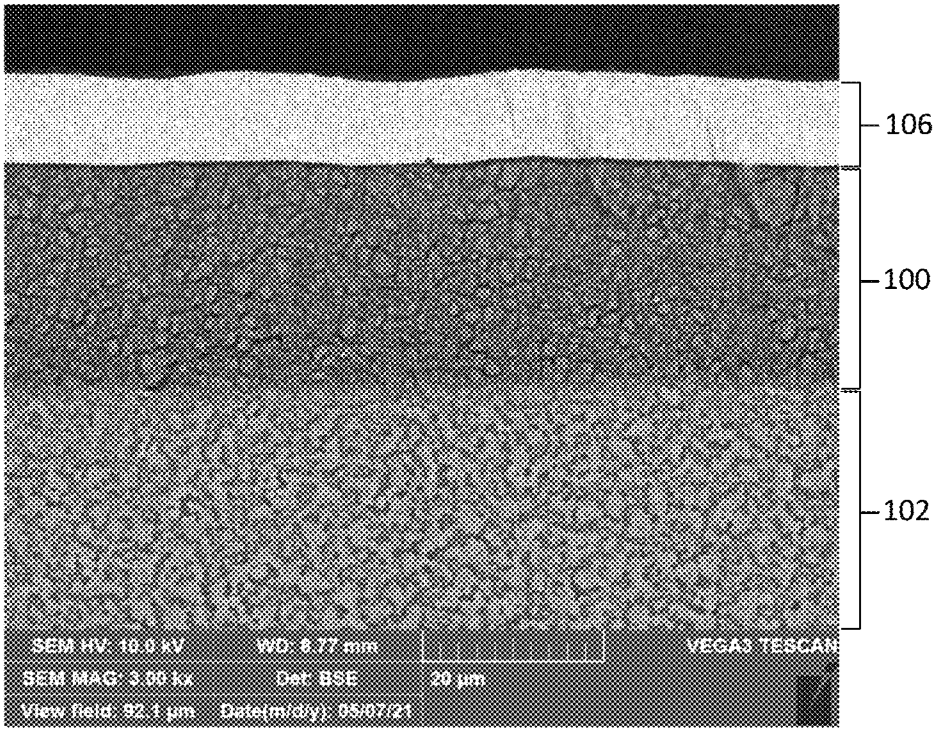
FIG. 8 shows a scanning electron micrograph of an electrochemical cell including an anode layer comprising silicon having an average particle size of about 700 nm and a stack pressure of 1500 psi.
Figure 9:
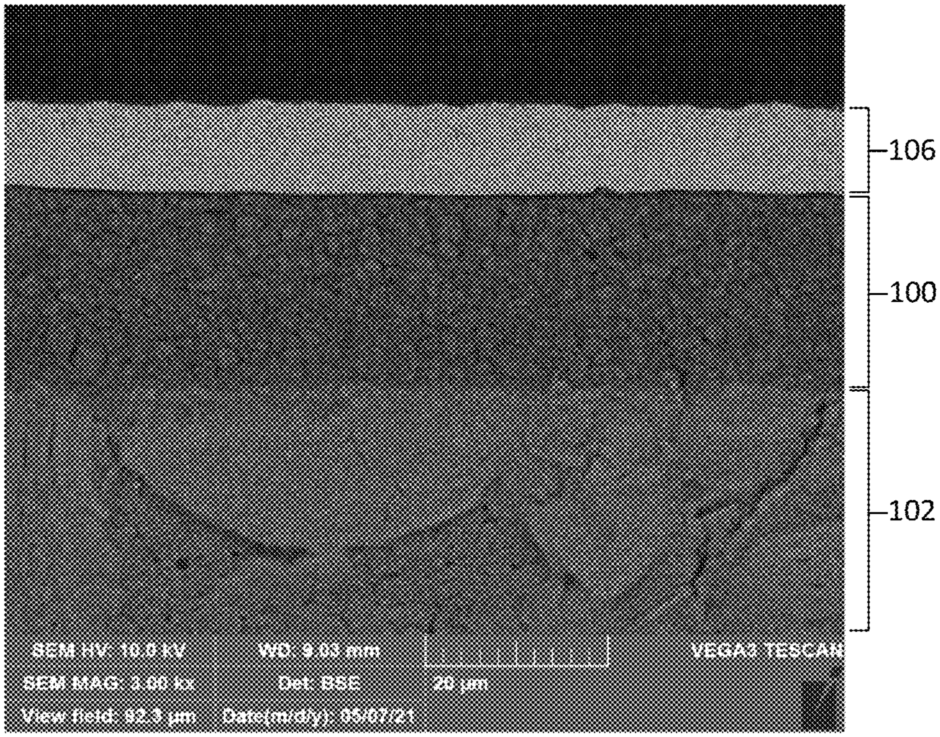
FIG. 9 shows a scanning electron micrograph of an electrochemical cell including an anode layer comprising silicon having an average particle size of about 1.25 μm and a stack pressure of 1500 psi.

Cycling data for each of the electrochemical cells of Table 1 was collected, including specific capacity of the cathode layer (mAh/g), minimum resistance (Ohm), and maximum resistance. The cells were cycled at a temperature of 45° C., a voltage window of 2.8-4.1 V, and a stack pressure of 300 psi. The cycling data is shown in FIG. 5. As can be seen from the cycling data, anode layers comprising nano-scale silicon (1, 3) had higher capacity and better stability at 300 psi stack pressure as compared to micro-scale silicon (2, 4). Of all anode layers tested at 300 psi, anode layer #1 performed the best.

Example 2: Crack Formation Based on Particle Size

Electrochemical cells comprising anode layers of the present disclosure were prepared and imaged using scanning electron microscopy. The SEM images are shown in FIGS. 6-9. The particle size range, the composition, and the cracking type are described for each of the silicon anode samples in Table 2. The binder for cells 7 and 8 included a blend of styrene-based thermoplastics, and the binder for cells 9 and 10 included a single styrene-based thermoplastic. The stack pressure applied during the first cell cycle for each of the samples in Table 2 was 1500 psi.

TABLE 2

| # | FIG. | Particle Size | Composition | Cracking Type |
|---|---|---|---|---|
| 7 | 6 | 50-80 nm | 50% silicon, 5% styrene-based thermoplastic blend, 5% carbon, 40% SSE | Vertical |
| 8 | 7 | 300 nm | 50% silicon, 5% styrene-based thermoplastic blend, 5% carbon, 40% SSE | Vertical |
| 9 | 8 | 700 nm | 50% silicon, 4% styrene-based thermoplastic, 5% carbon, 41% SSE | Random; Follows surface of particles |
| 10 | 9 | 1.25 μm | 50% silicon, 4% styrene-based thermoplastic, 5% carbon, 41% SSE | Random; Follows surface of particles |

Figure 10:
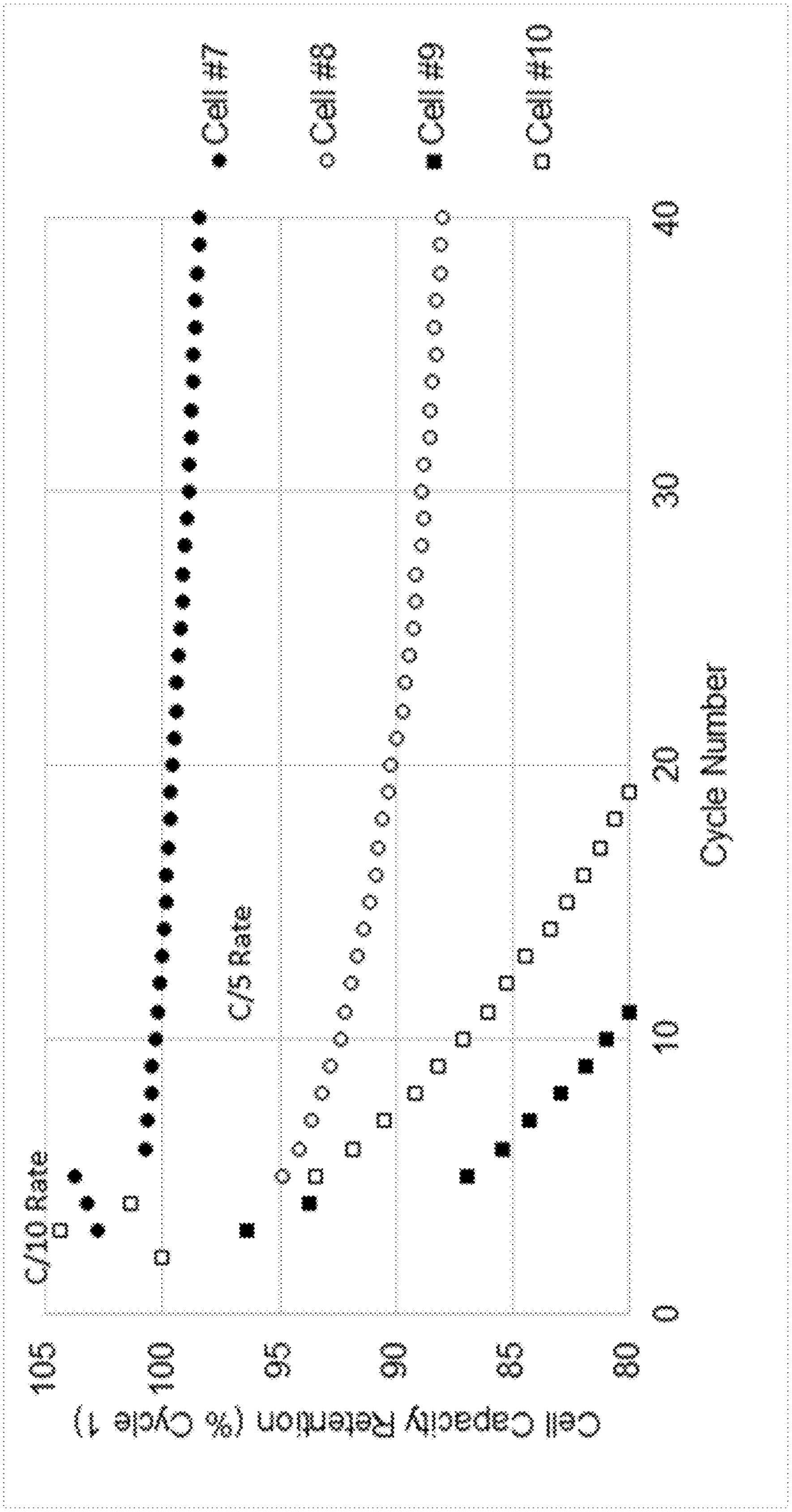
FIG. 10 shows the cycling data for the electrochemical cells shown in FIGS. 6-9.

Cycling data for each of the electrochemical cells of Table 2 was collected, including specific capacity of the cathode layer (mAh/g), minimum resistance (Ohm), and maximum resistance. The cells were cycled at a temperature of 45° C., a voltage window of 2.5-4.1 V, and a stack pressure of 1500 psi. The cycling data is shown in FIG. 10. As can be seen from the cycling data, anode layers comprising nano-scale silicon (7, 9) had cell capacity retention and better stability at 1500 psi stack pressure as compared to micro-scale silicon (8, 10, 11). Of all anode layers tested at 1500 psi, anode layer #7 performed the best at a stack pressure of 1500 psi.

Example 3: Angles of Crack Formation

The angles of crack formation in electrochemical cells of the present disclosure were measured via SEM imaging. FIGS. 11A-11E show the angles of crack formation in various electrochemical cells. The angles of the cracks ranged from about 65° to about 115°.

Figure 11A:
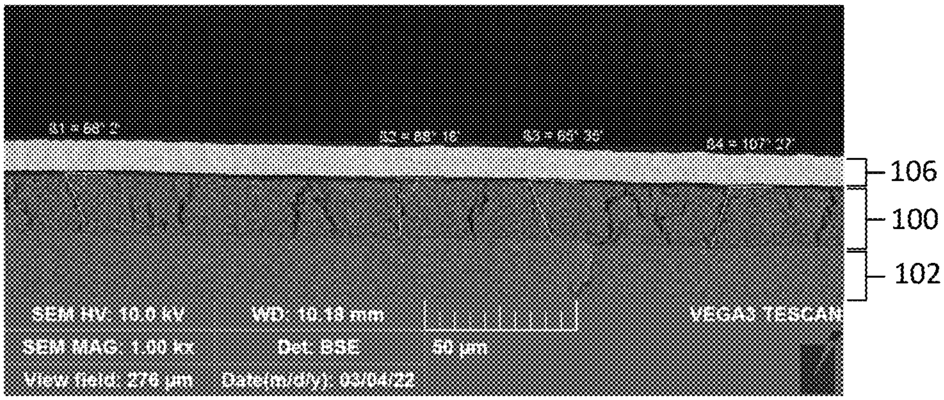
FIGS. 11A-11E show scanning electron micrographs of various electrochemical cells of the present disclosure showing the angles of cracking in relation to an anode layer.

In the cell depicted in FIG. 11A, the cracks formed at angles of 68° 2', 88° 16', 65° 35', and 107° 27'. Before SEM imaging, the cell underwent one formation cycle wherein the cell was charged in 10 hours and discharged in 10 hours at 70° C., a voltage window of 2.5-4.1 V, and a stack pressure of 1500 psi.

Figure 11B:
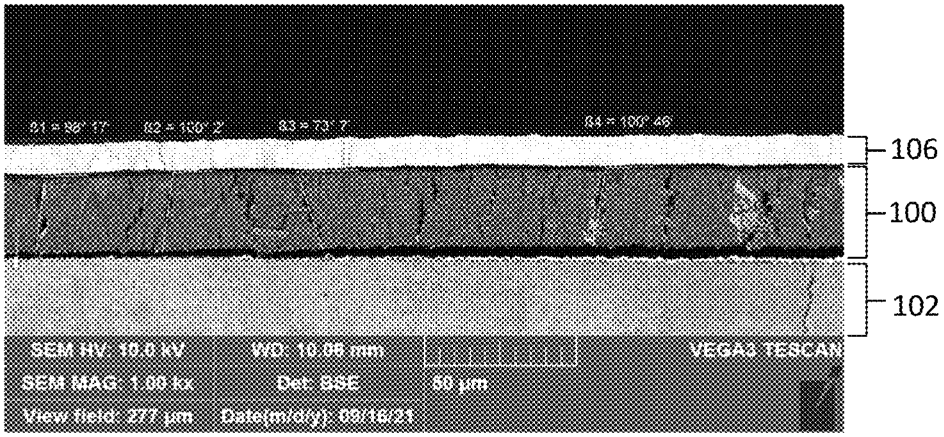

In the cell depicted in FIG. 11B, the cracks formed at angles of 98° 17', 100° 2', 73° 7', and 100° 46'. This cell is the same cell depicted in FIG. 3.

Figure 11C:
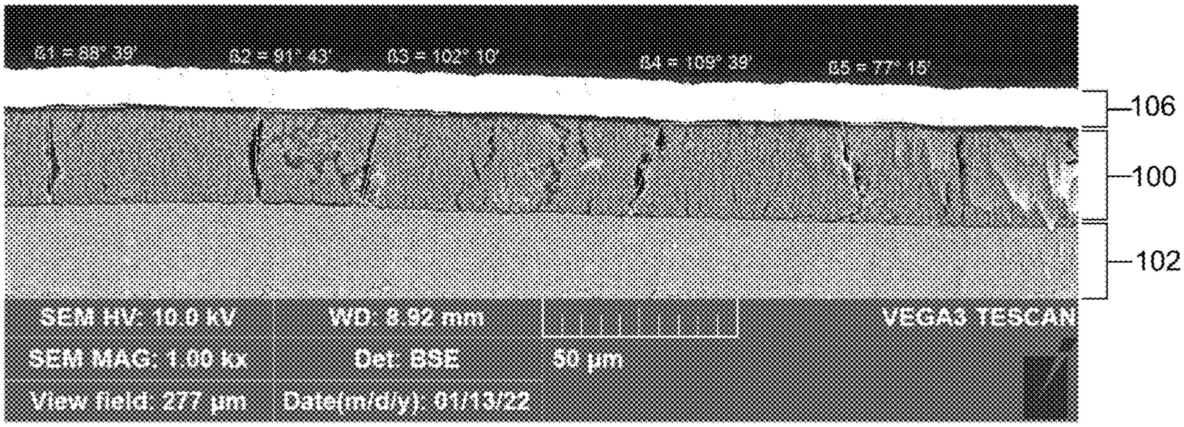

In the cell depicted in FIG. 11C, the cracks formed at angles of 88° 39', 91° 43', 102° 10', 109° 39', and 77°15'. This cell is the same cell depicted in FIG. 1.

Figure 11D:
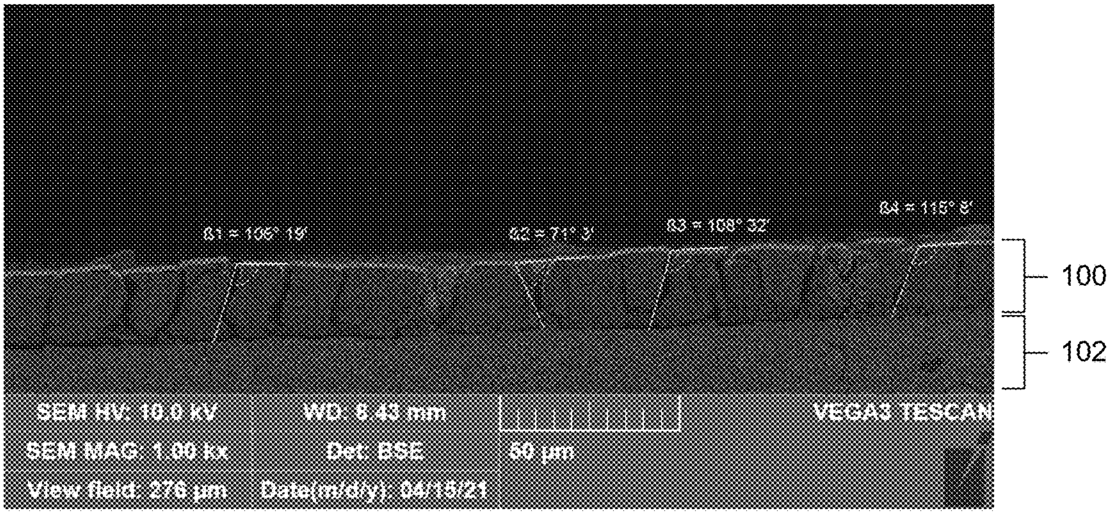

In the cell depicted in FIG. 11D, the cracks formed at angles of 106° 19', 71° 3', 108° 32', and 115° 8'. Before SEM imaging, the cell underwent 100 cycles wherein the cell was charged in 3 hours and discharged in 3 hours at 45° C., a voltage window of 2.5-4.1 V, and a stack pressure of 1500 psi.

Figure 11E:
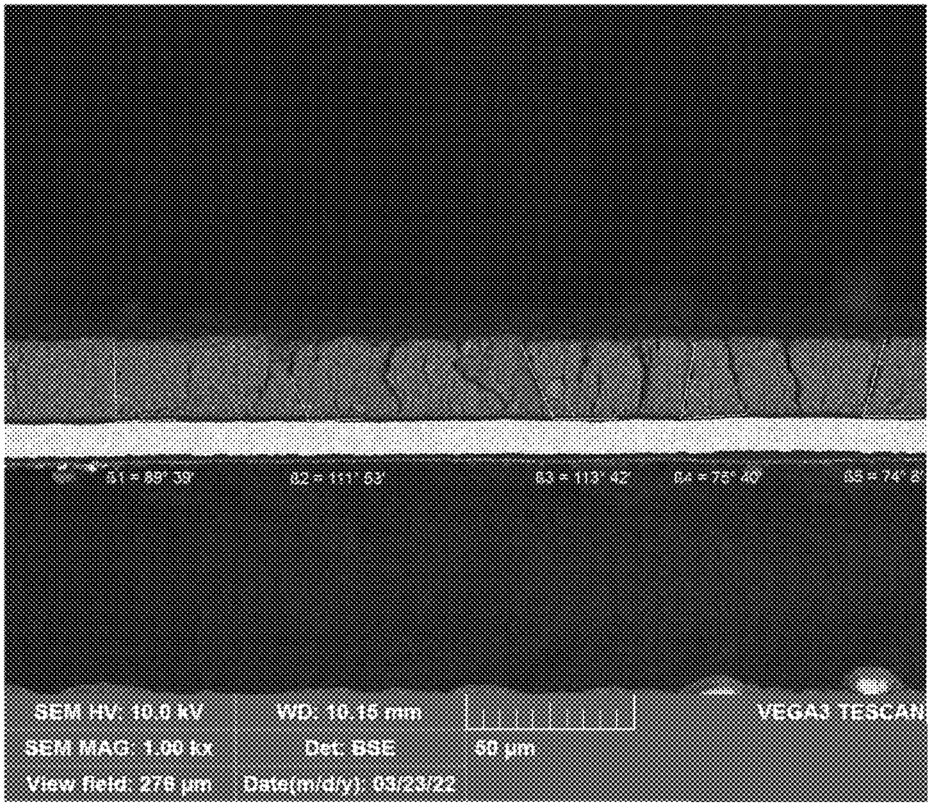

In the cell depicted in FIG. 11E, the cracks formed at angles of 89° 39', 111° 53', 113° 42', 75°40', and 74°8'. Before SEM imaging, the cell underwent 30 cycles wherein the cell was charged in 5 hours and discharged in 5 hours, 45° C., a voltage window of 2.5-4.1 V, and a stack pressure of 300 psi.

Example 4: Crack Formation at Different Stack Pressures

Electrochemical cells of the present disclosure were manufactured and cycled at varying stack pressures to determine the effect on crack formation. It was hypothesized that vertical cracking may be less pronounced with the application of lower stack pressure.

Figure 12A:
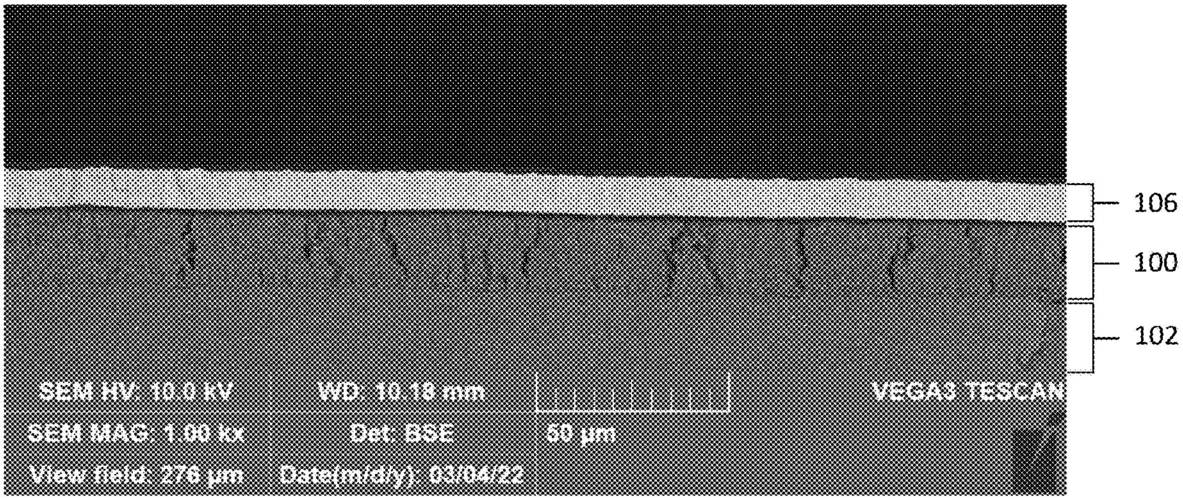
FIGS. 12A-12E show SEM images of electrochemical cells cycled at varying stack pressures and cycling conditions.
Figure 12B:
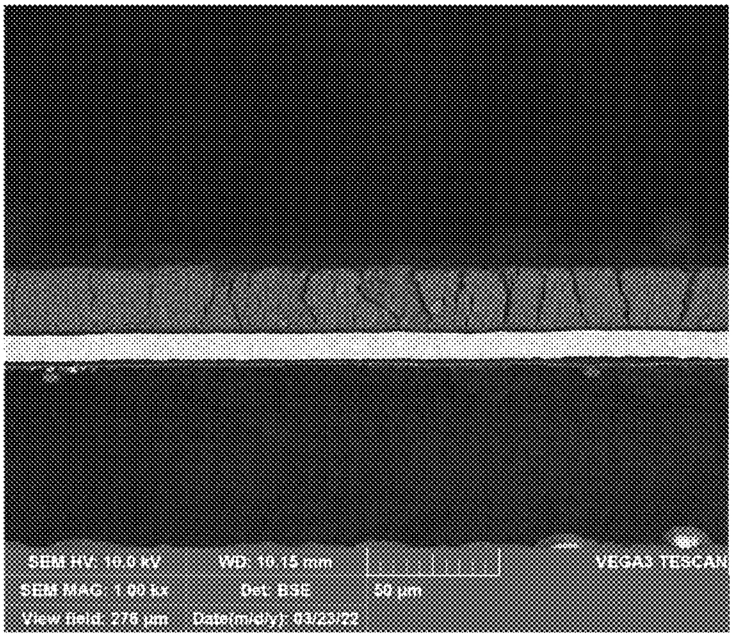

FIG. 12A shows an electrochemical cell imaged after 1 formation cycle wherein the cell was charged in 10 hours and discharged in 10 hours at 70°, a voltage window of 2.5-4.1 V, and a stack pressure of 300 psi. The cell was then cycled 30 times wherein the cell was charged in 5 hours and discharged in 5 hours at 45° C., a voltage window of 2.5-4.1 V, and a stack pressure of 300 psi. The resulting cell is shown in FIG. 12B, which shows the formation of clearly defined vertical cracks. The anode layer became detached from the separator layer and the cathode layer; thus, the separator layer and the cathode layer cannot be seen in the image.

Figure 12C:
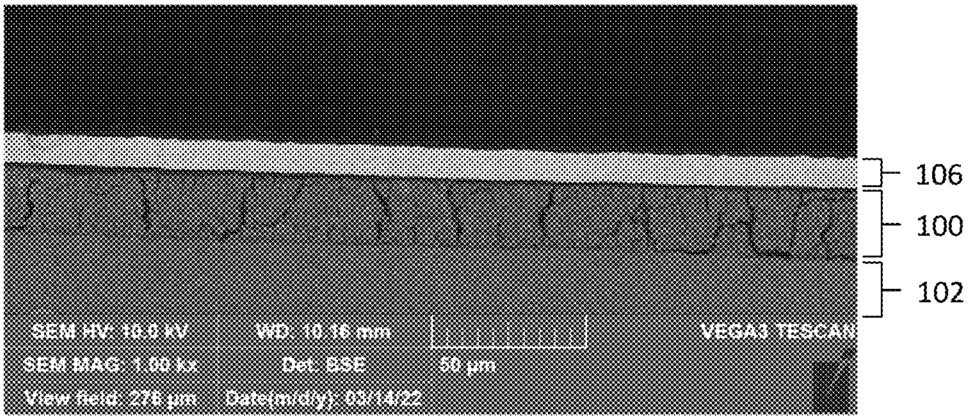
Figure 12D:
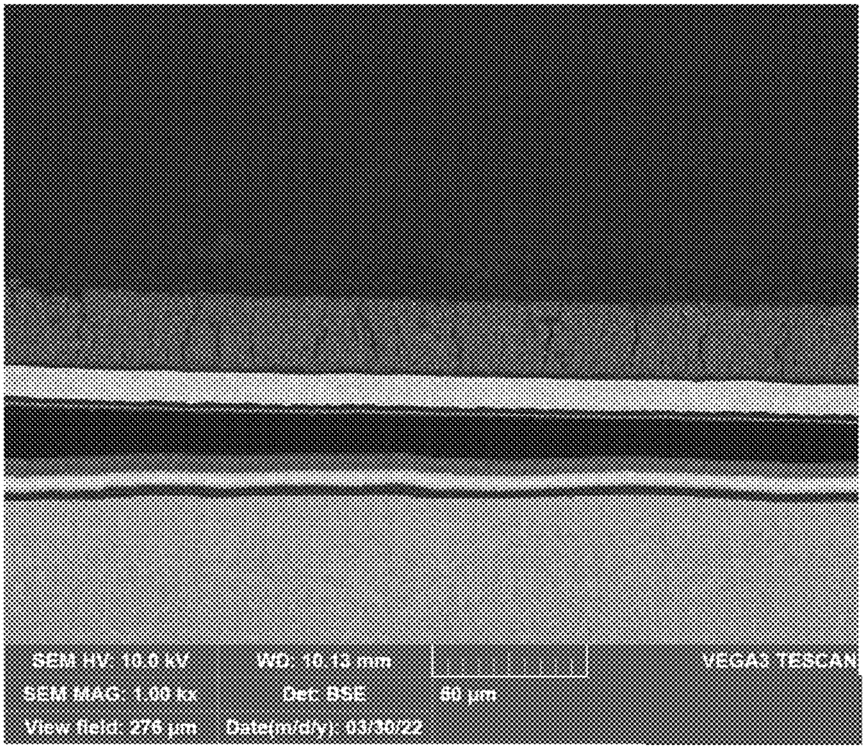

FIG. 12C shows an electrochemical cell imaged after 3 formation cycles wherein the cell was charged in 10 hours and discharged in 10 hours at 70° C., a voltage window of 2.5-4.1 V, and 1500 psi. The cell was then cycled 30 times wherein the cell was charged in 5 hours and discharged in 5 hours at 45° C., a voltage window of 2.5-4.1 V, and a stack pressure of 300 psi. The resulting cell is shown in FIG. 12D, which shows the formation of clearly defined vertical cracks. The anode layer became detached from the separator layer and the cathode layer; thus, the separator layer and the cathode layer cannot be seen in the image.

Figure 12E:
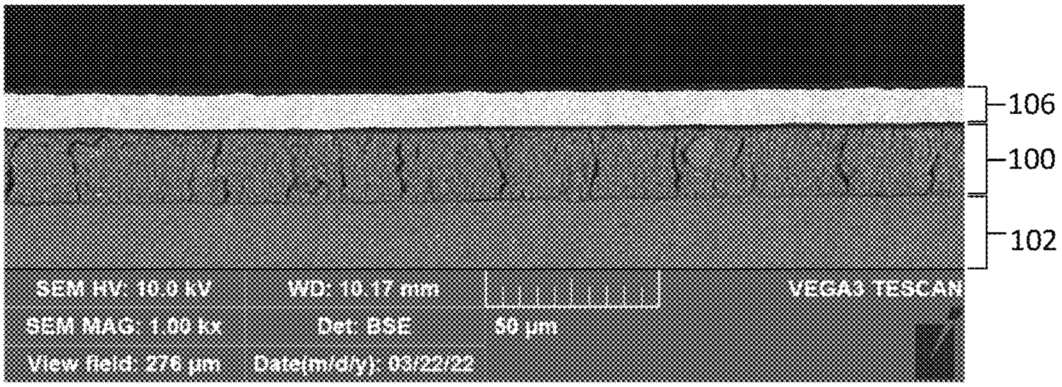

FIG. 12E shows an electrochemical cell imaged after 20 formation cycles wherein the cell was charged in 10 hours and discharged in 10 hours at 70° C., a voltage window of 2.5-4.1 V, and 1500 psi. The image shows the formation of clearly defined vertical cracks.

Example 5: Crack Formation in Anodes Comprising Different Binders

Anode layers of the present disclosure comprising different binders were formed to determine the effect of the binder on crack formation. The binders used are provided in Table 3 below:

TABLE 3

Figure 13A:
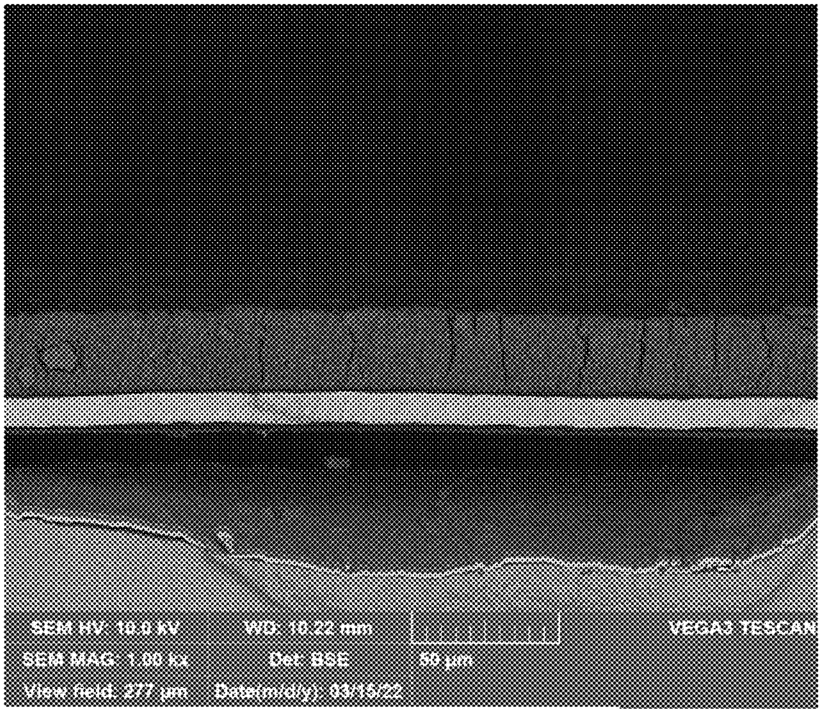
FIGS. 13A-13C show SEM images of electrochemical cells having different binders in the anode layer.
Figure 13B:
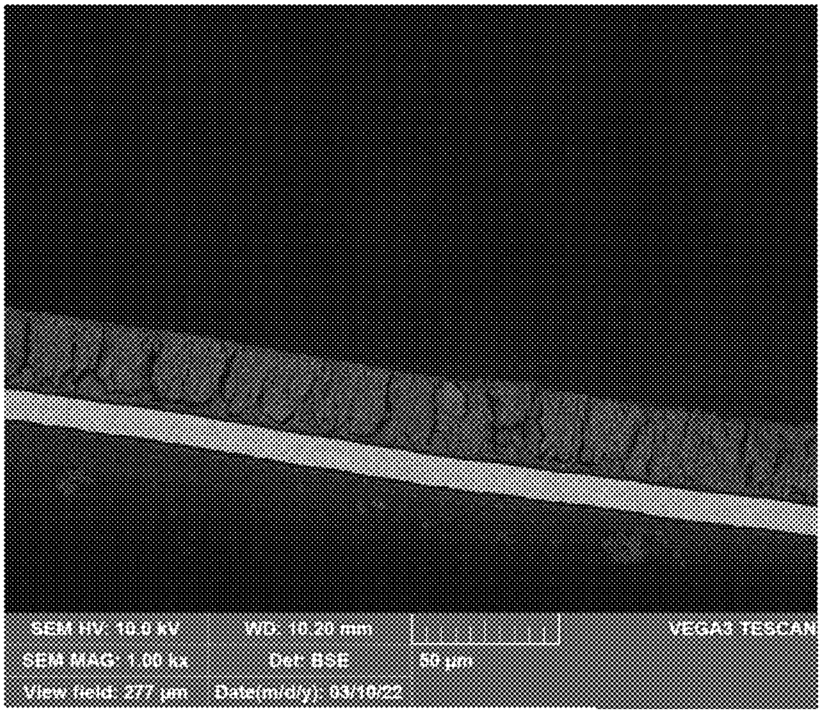
Figure 13C:
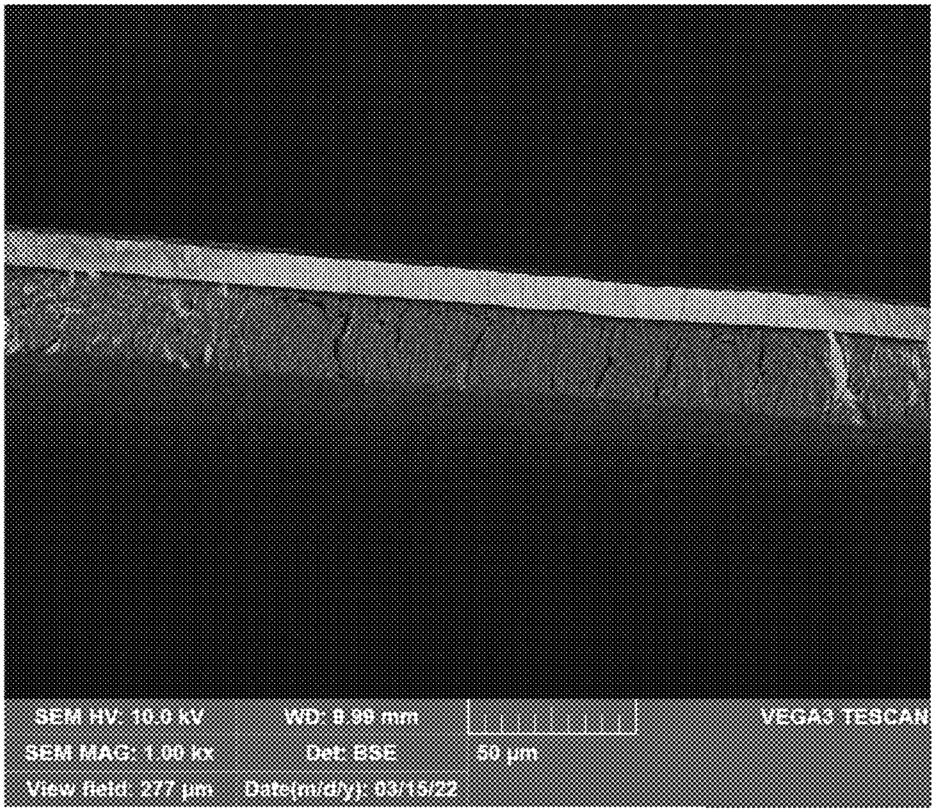

| FIG. | Binder | Amount |
|---|---|---|
| FIG. 13A | SIS | 4% |
| FIG. 13B | PVdF-HFP | 4% |
| FIG. 13C | SEBS | 4% |

It was observed that the anode layer of FIG. 13B was characterized by the presence of more horizontal cracking, whereas FIGS. 13A and 13C showed more vertical cracking. It is theorized that the PVdF-HFP may be more adhesive than the other polystyrene based block co-polymers, which may contribute to the formation of horizontal cracks.

Features described above as well as those claimed below may be combined in various ways without departing from the scope hereof. It should thus be noted that the matter contained in the above description or shown in the accompanying drawings should be interpreted as illustrative and not in a limiting sense. The above-described embodiments should be considered as examples of the present invention, rather than as limiting the scope of the invention. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions. The following claims are intended to cover generic and specific features described herein, as well as all statements of the scope of the present method and system, which, as a matter of language, might be said to fall there between.

What is claimed is:

1. An anode layer for use in an electrochemical cell, the anode layer comprising:

an anode active material comprising silicon having an average particle size of less than 1 μm, wherein the anode active material is present in an amount of greater than or equal to 40% by weight of the anode layer;

a solid-state electrolyte material, wherein the solid-state electrolyte material is present in an amount from about 25% to about 55% by weight of the anode layer; and a carbon-based conductive additive, wherein the anode layer is characterized by the formation of a plurality of vertical cracks having a thickness of less than or equal to 10 μm after a first cell cycle or a series of conditioning cycles.

2. The anode layer of claim 1, wherein the distance between each of the plurality of cracks is greater than or equal to 2 μm after the first cell cycle or the series of conditioning cycles of the electrochemical cell.

3. The anode layer of claim 1, wherein a stack pressure of about 100 psi to about 2500 psi is applied during the first cell cycle or the series of conditioning cycles.

4. The anode layer of claim 3, wherein a stack pressure of about 300 psi to about 1500 psi is applied during the first cell cycle or the series of conditioning cycles.

5. The anode layer of claim 4, wherein a stack pressure of about 1500 psi is applied during the first cell cycle or the series of conditioning cycles.

6. The anode layer of claim 1, wherein the silicon has an average particle size of less than 300 nm.

7. The anode layer of claim 1, wherein the carbon-based conductive additive is present in an amount from about 0% to about 15% by weight of the anode layer.

8. The anode layer of claim 1, wherein the carbon-based conductive additive is present in an amount from about 0% to about 5% by weight of the anode layer.

9. The anode layer of claim 1, wherein the solid-state electrolyte material is present in an amount of about 35% to about 45% by weight of the anode layer.

10. The anode layer of claim 1, wherein the solid-state electrolyte material comprises a sulfide solid-state electrolyte material.

11. The anode layer of claim 1, further comprising a binder, wherein the binder is present in an amount from about 0% to about 20% by weight of the anode layer.

12. The anode layer of claim 11, wherein the binder is present in an amount from about 4% to about 5% by weight of the anode layer.

13. The anode layer of claim 11, wherein the binder comprises one or more styrenic block copolymers or one or more styrene-based thermoplastics.

14. The anode layer of claim 13, wherein the binder is selected from the group consisting of styrene-butadiene-styrene block copolymer (SBS), styrene-ethylene-butylene-styrene block copolymer (SEBS), ethylene propylene diene monomer rubber (EPDM), polystyrene (PS), styrene-isoprene block copolymer (SIS), and combinations thereof.

15. The anode layer of claim 1, wherein the anode layer is coated on a current collector.

16. The anode layer of claim 15, wherein the current collector comprises one or more of copper, nickel, and steel.

17. The anode layer of claim 1, wherein the anode layer has a thickness from about 1 μm to about 100 μm.

18. The anode layer of claim 17, wherein the anode layer has a thickness from about 10 μm to about 50 μm.

19. The anode layer of claim 1, wherein the anode active material is present in the anode layer in an amount from about 40% to about 85% by weight of the anode layer.

20. The anode layer of claim 19, wherein the anode active material is present in the anode layer in an amount from about 40% to about 60% by weight of the anode layer.

21. The anode layer of claim 1, wherein the silicon comprises particles having a surface area of about 1 $m^2/g$ to about 50 $m^2/g$.

22. An anode layer for use in an electrochemical cell, the anode layer comprising:

an anode active material comprising silicon having an average particle size of less than 1 μm, wherein the anode active material is present in an amount of greater than or equal to 40% by weight of the anode layer;

a carbon-based conductive additive; and a solid electrolyte material, wherein the solid-state electrolyte material is present in an amount from about 25% to about 55% by weight of the anode layer, wherein the anode layer is characterized by the formation of a plurality of vertical cracks having a thickness of less than or equal to 10 μm after a first cell cycle or a series of conditioning cycles.

* * * * *